US012576566B2

(12) United States Patent
  Asanuma

(10) Patent No.: US 12,576,566 B2
(45) Date of Patent: Mar. 17, 2026

(54) FOAM MOLDING METHOD, CONTROL METHOD FOR INJECTION MOLDING MACHINE FOR FOAM MOLDING, AND INJECTION MOLDING MACHINE FOR FOAM MOLDING

(71) Applicant: Shibaura Machine Co., Ltd., Chiyoda-ku (JP)

(72) Inventor: Nobuyuki Asanuma, Numazu (JP)

(73) Assignee: Shibaura Machine Co., Ltd., Chiyoda-ku (JP)

( * ) Notice: Subject to any disclaimer, the term of this patent is extended or adjusted under 35 U.S.C. 154(b) by 266 days.

(21) Appl. No.: 18/550,442

(22) PCT Filed: Feb. 24, 2022

(86) PCT No.: PCT/JP2022/007613
  § 371 (c)(1),
  (2) Date: Sep. 13, 2023

(87) PCT Pub. No.: WO2022/196281
  PCT Pub. Date: Sep. 22, 2022

(65) Prior Publication Data
  US 2024/0165860 A1  May 23, 2024

(30) Foreign Application Priority Data
  Mar. 16, 2021  (JP) ................................. 2021-042726

(51) Int. Cl.
  B29C 44/42 (2006.01)
  B29C 44/02 (2006.01)
  (Continued)

(52) U.S. Cl.
  CPC ............ B29C 44/422 (2013.01); B29C 44/02 (2013.01); B29C 44/3442 (2013.01);
  (Continued)

(58) Field of Classification Search
  CPC ..................................................... B29C 44/422
  See application file for complete search history.

(56) References Cited

U.S. PATENT DOCUMENTS

| | | | |
|---|---|---|---|
| 5,158,986 A | 10/1992 | Cha et al. | |
| 5,334,356 A | 8/1994 | Baldwin et al. | |
| (Continued) | | | |

FOREIGN PATENT DOCUMENTS

| | | | |
|---|---|---|---|
| CN | 101077610 A | 11/2007 | |
| JP | 59-109335 A | 6/1984 | |
| (Continued) | | | |

OTHER PUBLICATIONS

Machine translation JPS59109335A (Year: 1984).*

(Continued)

*Primary Examiner* — Abbas Rashid
*Assistant Examiner* — Ayne K. Swier
(74) *Attorney, Agent, or Firm* — Oblon, McClelland, Maier & Neustadt, L.L.P.

(57) ABSTRACT

A foam molding method includes: moving a screw backward to take air into a heating barrel through a nozzle part in a state in which a shut-off nozzle is opened, the shut-off nozzle that opens or closes the nozzle part for injecting the molten resin and is disposed on a heating barrel; closing the shut-off nozzle and moving the screw forward, to diffuse the air taken into the heating barrel, in the molten resin in the heating barrel; feeding the molten resin forward while dispersing the air as the air bubbles in the molten resin by moving the screw backward while rotating it in a state in which the shut-off nozzle is closed; and opening the shut-off nozzle, to inject the molten resin containing the dispersed air bubbles into the cavity.

5 Claims, 19 Drawing Sheets

(51) Int. Cl.

| | |
|---|---|
| *B29C 44/34* | (2006.01) |
| *B29C 44/60* | (2006.01) |
| *B29C 45/23* | (2006.01) |
| *B29C 45/47* | (2006.01) |
| *B29K 105/04* | (2006.01) |

(52) U.S. Cl.
CPC ............ *B29C 44/425* (2013.01); *B29C 44/60* (2013.01); *B29C 45/23* (2013.01); *B29C 45/47* (2013.01); *B29C 2945/76545* (2013.01); *B29C 2945/76665* (2013.01); *B29C 2945/76688* (2013.01); *B29K 2105/04* (2013.01)

(56) References Cited

U.S. PATENT DOCUMENTS

| | | | |
|---|---|---|---|
| 5,997,781 | A | 12/1999 | Nishikawa et al. |
| RE37,932 | E | 12/2002 | Baldwin et al. |
| 11,207,809 | B2 | 12/2021 | Yusa et al. |
| 2021/0001532 | A1* | 1/2021 | Fitzpatrick .............. B29C 45/77 |

FOREIGN PATENT DOCUMENTS

| | | |
|---|---|---|
| JP | 8-207094 A | 8/1996 |
| JP | 2625576 B2 | 7/1997 |
| JP | 9-323338 A | 12/1997 |
| JP | 11-90953 A | 4/1999 |
| JP | 2001-179779 A | 7/2001 |
| JP | 2003-39474 A | 2/2003 |
| JP | 2005-271448 A | 10/2005 |
| JP | 3788750 B2 | 6/2006 |
| JP | 2008-12803 A | 1/2008 |
| JP | 4144916 B2 | 9/2008 |
| JP | 2019-104125 A | 6/2019 |
| JP | 6533009 B2 | 6/2019 |
| JP | 2019-198993 A | 11/2019 |
| JP | 2019-199011 A | 11/2019 |
| KR | 20020038378 A * | 5/2002 ............. B29C 44/42 |

OTHER PUBLICATIONS

Machine translation JPH08207094A (Year: 1996).*
Machine translation JPH09323338A (Year: 1997).*
Machine translation KR20020038378A (Year: 2002).*
Machine translation JP2003029474A (Year: 2003).*
Machine translation JP2005271448A (Year: 2005).*
Machine translation CN101077610A (Year: 2007).*
Machine translation JP2008012803A (Year: 2008).*
Machine translation JP2019198993A (Year: 2019).*
Machine translation JP2019199011A (Year: 2019).*
International Search Report Issued Apr. 12, 2022, in PCT/JP2022/007613, filed on Feb. 24, 2022, 2 pages.
Combined Chinese Office Action and Search Report issued Sep. 30, 2025 in Chinese Patent Application No. 202280021119.X (with English translation), 8 pages.
Office Action issued Jun. 18, 2024, in corresponding Japanese Patent Application No. 2021-042726 (with English Translation), 3 pages.

* cited by examiner

START

MOVE SCREW BACKWARD, TO TAKE AIR INTO HEATING BARREL THROUGH SUPPLY PORT — ST21

MOVE SCREW FORWARD, AND CLOSE SUPPLY PORT — ST22

MOVE SCREW BACKWARD WHILE ROTAITING IT, TO DISPERSE TAKEN-IN AIR AS AIR BUBBLES IN MOLTEN RESIN — ST23

OPEN SHUT-OFF NOZZLE, TO INJECT MOLTEN RESIN CONTAINING DISPERSED AIR BUBBLES — ST24

RETURN

1

FOAM MOLDING METHOD, CONTROL METHOD FOR INJECTION MOLDING MACHINE FOR FOAM MOLDING, AND INJECTION MOLDING MACHINE FOR FOAM MOLDING

CROSS-REFERENCE TO RELATED APPLICATIONS

This application is a national stage application of International Application No. PCT/JP2022/007613, filed Feb. 24, 2022, which designates the United States, incorporated herein by reference, and which claims the benefit of priority from Japanese Patent Application No. 2021-042726, filed Mar. 16, 2021, the entire contents of which are incorporated herein by reference.

TECHNICAL FIELD

The present invention relates to a foam molding method for molding a foam molded article, a control method for an injection molding machine for foam molding, and the injection molding machine for foam molding.

BACKGROUND ART

In the related art, as molding of resin using an injection molding machine, there is known injection foam molding, what is called physical foaming, using nitrogen or carbon dioxide as a foam material. In such foam molding, by performing molding while foaming the foam material, effects such as weight reduction of a molded article and reduction of a material to be used can be obtained. In performing foam molding by using the injection molding machine, as a method for injecting a foam material into molten resin, for example, as disclosed in Patent Documents 1 to 3, developed is a method for pressurizing the foam material to be supplied to a heating barrel of the injection molding machine. As another method, as disclosed in Patent Documents 4 and 5, developed is a method of providing a starvation zone in an introduction speed adjusting container or a screw, and injecting a foam material into the starvation zone in a plasticization cylinder via the introduction speed adjusting container from a bomb in which the foam material such as nitrogen or carbon dioxide is stored.

CITATION LIST

Patent Literature

Patent Document 1: Japanese Patent No. 2625576
Patent Document 2: Japanese Patent No. 3788750
Patent Document 3: Japanese Patent No. 4144916
Patent Document 4: Japanese Patent No. 6533009
Patent Document 5: Japanese Patent Application Laid-open No. 2019-104125
Patent Document 6: Japanese Patent Application Laid-open No. 2019-198993

SUMMARY OF INVENTION

Problem to be Solved by the Invention

However, in performing foam molding, in a case in which foam molding is performed by using an injection molding machine dedicated to foam molding, a device such as a high-pressure gas generation device or an introduction speed adjusting container, or a screw including a starvation zone, initial investment cost becomes high. Thus, in a case of performing foam molding using the injection molding machine, there has been room for improvement in terms of cost.

The present invention has been made in view of such a situation, and provides a foam molding method that can reduce cost in performing foam molding, a control method for an injection molding machine for foam molding, and the injection molding machine for foam molding.

Means for Solving Problem

In order to solve the above problem and achieve the object, a foam molding method according to the present invention is for molding a foam molded article by injecting molten resin containing air bubbles that are uniformly dispersed, into a cavity formed by a mold, the foam molding method including: moving a screw backward to take air into a barrel through a nozzle part in a state in which a shut-off nozzle is opened, the shut-off nozzle disposed on the barrel for kneading the molten resin in which the screw is disposed, and opening and closing the nozzle part for injecting the molten resin; closing the shut-off nozzle and moving the screw forward to diffuse the air taken into the barrel, in the molten resin in the barrel; feeding the molten resin forward while dispersing the air as the air bubbles in the molten resin by moving the screw backward while rotating the screw in a state in which the shut-off nozzle is closed; and opening the shut-off nozzle, to inject the molten resin containing the dispersed air bubbles into the cavity.

In order to solve the above problem and achieve the object, a foam molding method according to the present invention is for molding a foam molded article by injecting molten resin containing air bubbles that are uniformly dispersed, into a cavity formed by a mold, the foam molding method including: moving a screw backward, the screw disposed inside a barrel in which the molten resin is kneaded, and opening a supply port that is disposed in front of the screw in the barrel and capable of switching between a state in which air is able to be supplied into the barrel and a state in which the air is unable to be supplied into the barrel, to take the air into the barrel through the supply port; moving the screw forward and closing the supply port, to diffuse the air taken into the barrel in the molten resin in the barrel; feeding the molten resin forward while dispersing the air as the air bubbles in the molten resin by moving the screw backward while rotating the screw in a state in which the supply port is closed; and injecting the molten resin containing the dispersed air bubbles into the cavity.

In order to solve the above problem and achieve the object, a foam molding method according to the present invention is for molding a foam molded article by injecting molten resin containing air bubbles that are uniformly dispersed, into a cavity formed by a mold, the foam molding method including: moving a screw backward, the screw disposed inside a barrel in which the molten resin is kneaded, and opening a supply port that is disposed in front of the screw in the barrel and capable of switching between a state where compressed gas is able to be supplied into the barrel and a state where the compressed gas is unable to be supplied into the barrel, to take the compressed gas into the barrel through the supply port; moving the screw forward and closing the supply port, to diffuse the compressed gas taken into the barrel, in the molten resin in the barrel; feeding the molten resin forward while dispersing the compressed gas as the air bubbles in the molten resin by moving the screw backward while rotating the screw in a state in which the supply port is closed; and injecting the molten resin containing the dispersed air bubbles into the cavity.

In order to solve the above problem and achieve the object, a control method according to the present invention is for an injection molding machine for foam molding for molding a foam molded article by injecting molten resin containing air bubbles that are uniformly dispersed, into a cavity formed by a mold, the control method including: moving a screw backward to take air into a barrel through a nozzle part in a state in which a shut-off nozzle is opened, the shut-off nozzle disposed on the barrel for kneading the molten resin in which the screw is disposed, and opening and closing the nozzle part for injecting the molten resin; closing the shut-off nozzle and moving the screw forward, to diffuse the air taken into the barrel, in the molten resin in the barrel; feeding the molten resin forward while dispersing the air as the air bubbles in the molten resin by moving the screw backward while rotating the screw in a state in which the shut-off nozzle is closed; and opening the shut-off nozzle, to inject the molten resin containing the dispersed air bubbles into the cavity.

In order to solve the above problem and achieve the object, an injection molding machine according to the present invention is for foam molding, and includes: a mold forming a cavity for molding a foam molded article from molten resin containing air bubbles that are uniformly dispersed; a barrel in which the molten resin is kneaded; a screw that is disposed rotatably in the barrel, and capable of moving in an axis direction of rotation in the barrel; a nozzle part that is disposed on the barrel, and injects the molten resin in the barrel into the cavity; a shut-off nozzle that opens and closes the nozzle part; and a control unit that controls operations of the screw and the shut-off nozzle, wherein the control unit, when injecting the molten resin in the barrel into the cavity, takes the air into the barrel through the nozzle part by moving the screw backward in a state in which the shut-off nozzle is opened, diffuses the air taken into the barrel in the molten resin in the barrel by closing the shut-off nozzle and moving the screw forward, feeds the molten resin forward while dispersing the air as the air bubbles in the molten resin by moving the screw backward while rotating the screw in a state in which the shut-off nozzle is closed, and opens the shut-off nozzle, to inject the molten resin containing the dispersed air bubbles into the cavity.

Effect of the Invention

The foam molding method, the control method for the injection molding machine for foam molding, and the injection molding machine for foam molding according to the present invention can reduce cost in performing foam molding.

BRIEF DESCRIPTION OF DRAWINGS

FIG. 4 is a detailed view of a heating barrel illustrated in FIG. 2;

FIG. 12 is an explanatory diagram illustrating a state in which measured molten resin is injected;

DESCRIPTION OF EMBODIMENTS

The following describes embodiments of a control method for an injection molding machine for foam molding and the injection molding machine for foam molding according to the present disclosure in detail based on the drawings. The present invention is not limited to the embodiments. Constituent elements in the following embodiments encompass a constituent element that can be replaced and easily conceivable by those skilled in the art, or substantially the same constituent element.

First Embodiment

Figure 1:
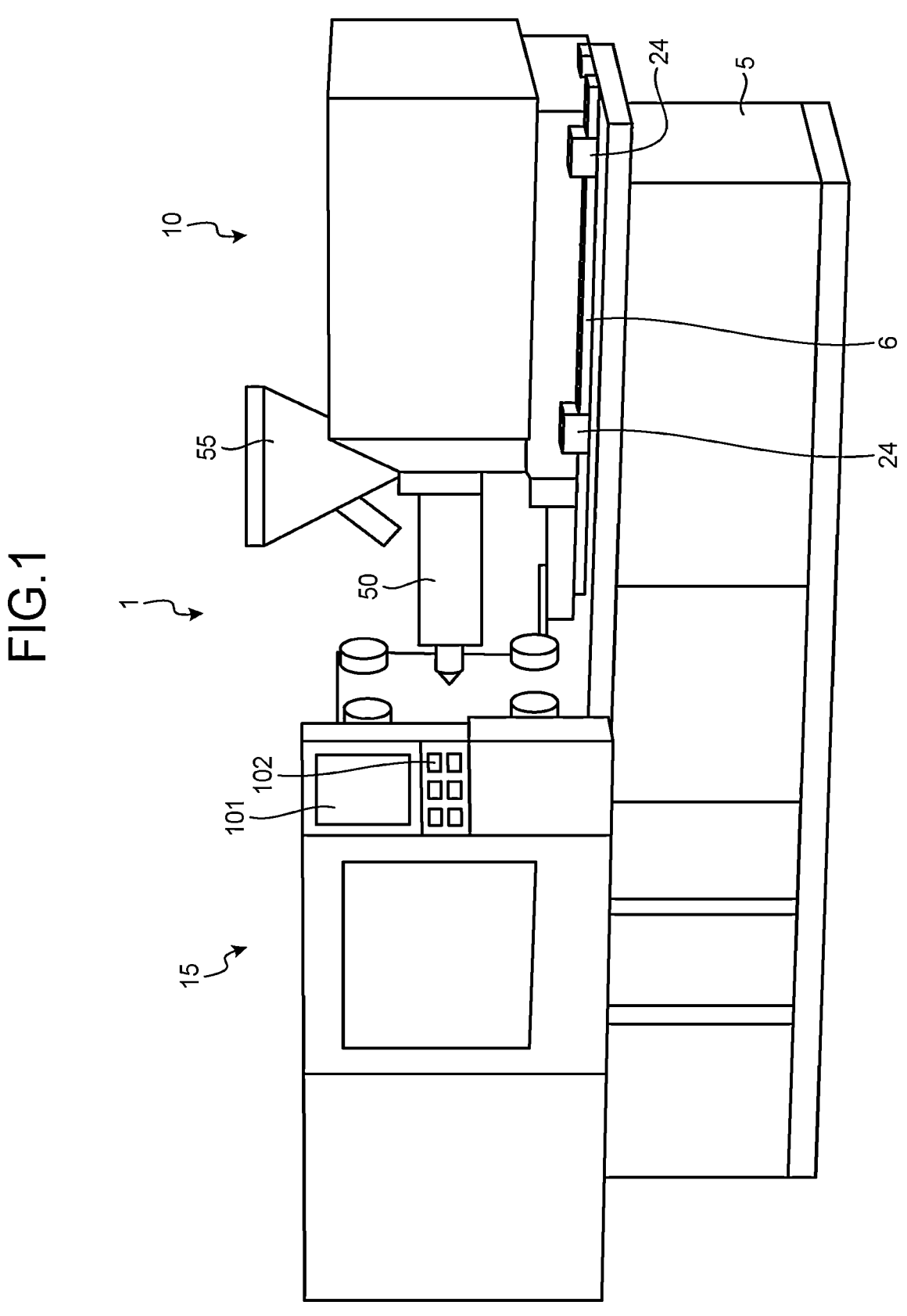
FIG. 1 is a perspective view of an injection molding machine for foam molding according to a first embodiment.
Figure 2:
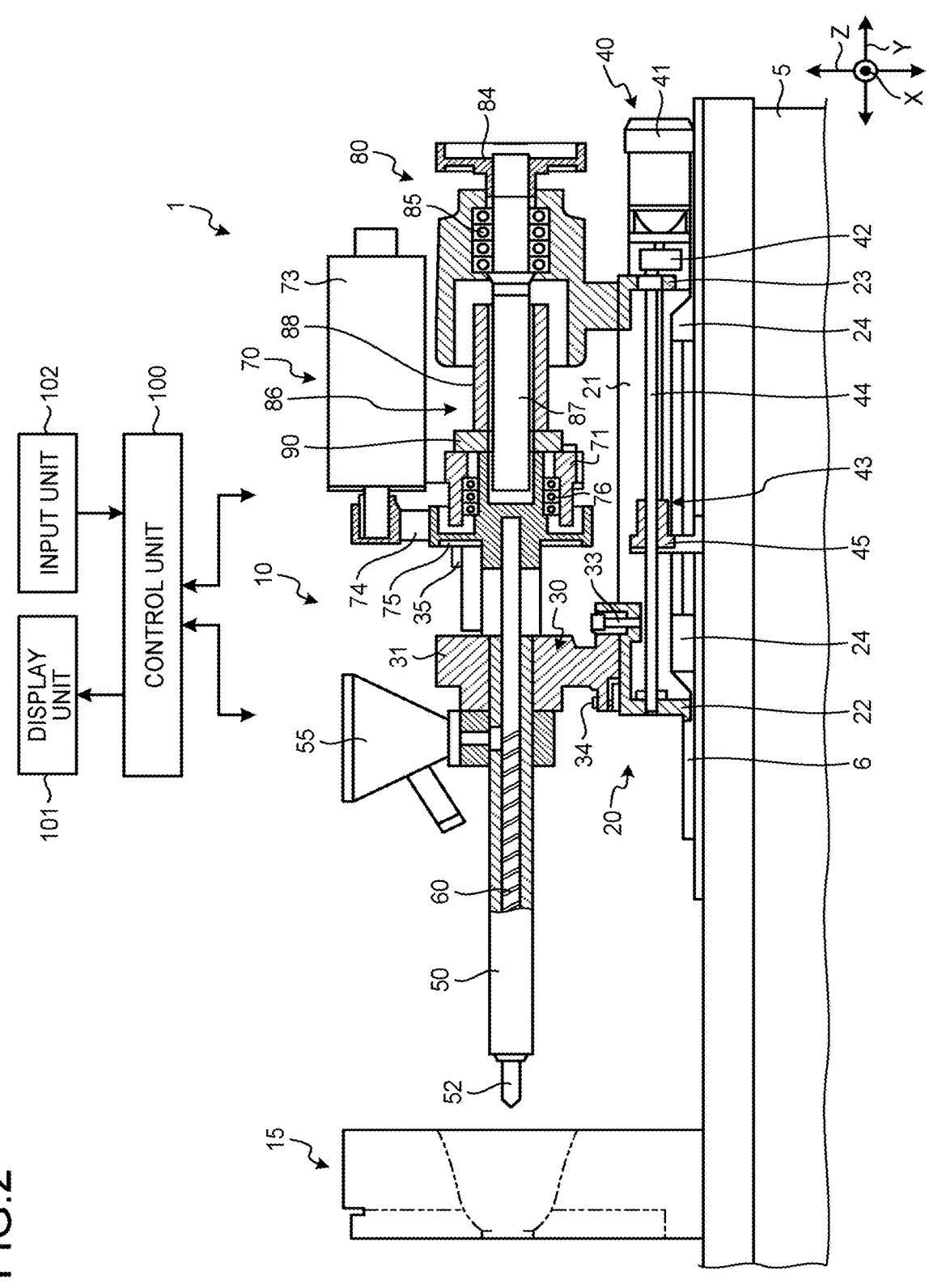
FIG. 2 is a cross-sectional view of a principal part illustrating a device configuration of the injection molding machine for foam molding according to the first embodiment.
Figure 3:
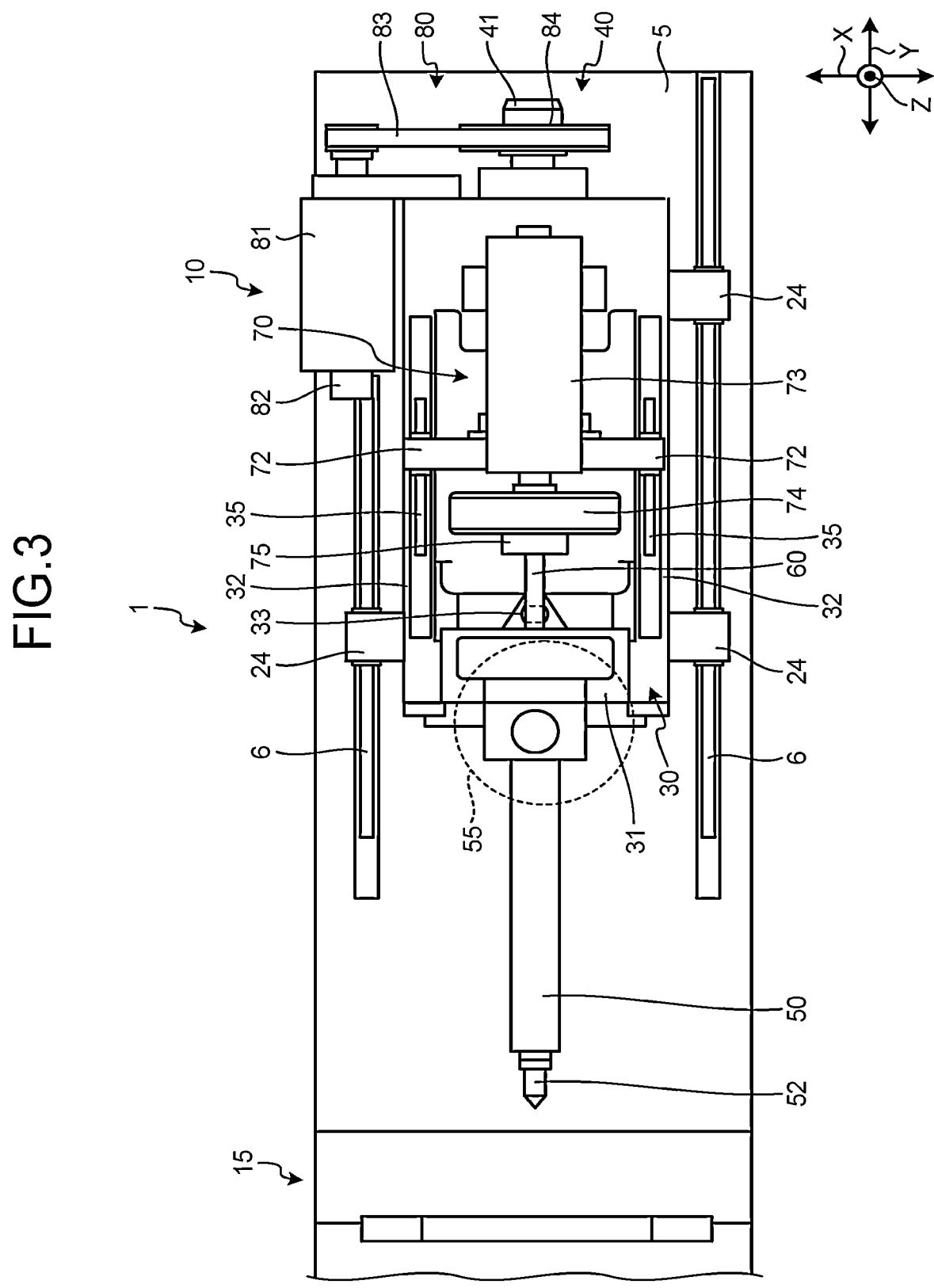
FIG. 3 is a plan view of a principal part illustrating a device configuration of the injection molding machine for foam molding according to the first embodiment.

FIG. 1 is a perspective view of an injection molding machine 1 for foam molding according to a first embodiment. FIG. 2 is a cross-sectional view of a principal part illustrating a device configuration of the injection molding machine 1 for foam molding according to the first embodiment. FIG. 3 is a plan view of a principal part illustrating the device configuration of the injection molding machine 1 for foam molding according to the first embodiment. In the following description, an upper and lower direction in a normal use state of the injection molding machine 1 for foam molding is assumed to be an upper and lower direction Z of the injection molding machine 1 for foam molding, an upper side in the normal use state of the injection molding machine 1 for foam molding is assumed to be an upper side of the injection molding machine 1 for foam molding, and a lower side in the normal use state of the injection molding machine 1 for foam molding is assumed to be a lower side of the injection molding machine 1 for foam molding. Additionally, in the following description, a longitudinal direction Y of the injection molding machine 1 for foam molding is also assumed to be the longitudinal direction Y of each part including the injection molding machine 1 for foam molding, and a direction orthogonal to both of the upper and lower direction Z and the longitudinal direction Y of the injection molding machine 1 for foam molding is assumed to be a width direction X of the injection molding machine 1 for foam molding.

<Injection Molding Machine 1 for Foam Molding>

The injection molding machine 1 for foam molding according to the first embodiment includes a base 5, and an injection device 10, a mold clamping device 15, and the like disposed on the base 5. In the vicinity of the center in the longitudinal direction Y of the injection molding machine 1 for foam molding, disposed are a display unit 101 that displays various kinds of information of the injection molding machine 1 for foam molding, and an input unit 102 used by an operator for performing an input operation on the injection molding machine 1 for foam molding.

The base 5 is formed in a substantially rectangular parallelepiped shape the longitudinal direction of which is the longitudinal direction Y of the injection molding machine 1 for foam molding, and a first rail 6 is disposed on an upper surface of the base 5. Two first rails 6 are disposed to be separated from each other in the width direction X on the base 5, and both of the two first rails 6 are formed to extend along the longitudinal direction of the base 5. The injection device 10 is placed on the first rails 6 to be movable along an extending direction of the first rails 6, and due to this, the injection device 10 is disposed to be movable in the longitudinal direction Y.

The mold clamping device 15 is disposed on one side of the injection device 10 in the longitudinal direction Y on the base 5. The mold clamping device 15 includes a mold clamping mechanism, and opens or closes a mold 16 (refer to FIG. 4) assembled to the mold clamping mechanism. The mold clamping device 15 is preferably a servomotor driving type, but may be a hydraulic pressure driving type. The injection molding machine 1 for foam molding according to the present first embodiment includes covers on outer sides of the injection device 10 and the mold clamping device 15. FIG. 1 illustrates the injection device 10 and the mold clamping device 15 in a state of being covered with the covers, respectively.

<Injection Device 10>

In the following description, a side on which the mold clamping device 15 is positioned with respect to the injection device 10 in the longitudinal direction Y is assumed to be the front or a front side, and an opposite side of the side on which the mold clamping device 15 is positioned with respect to the injection device 10 in the longitudinal direction Y is assumed to be the rear or a rear side.

The injection device 10 includes a frame 20, a heating barrel 50, a screw 60, a rotation mechanism 70 that rotates the screw 60, a forward/backward movement mechanism 80 that moves the screw 60 forward or backward, and a propulsion mechanism 40 for the injection device 10. The frame 20 includes a base stand 21 and an upper frame 30 attached to the base stand 21. The base stand 21 is a frame body that is flat in the upper and lower direction Z, and leg parts 24 are disposed at four points including both sides in the longitudinal direction Y and both sides in the width direction X. The leg parts 24 at the four points are placed on the two first rails 6 disposed on the base 5 to be movable along the extending direction of the first rail 6. Due to this, the base stand 21 is supported to be slidable in the longitudinal direction Y with respect to the base 5.

The propulsion mechanism 40 includes an electric motor for driving 41 and a ball screw mechanism 43. The electric motor for driving 41 is attached to a rear wall 23 positioned behind the base stand 21 in the longitudinal direction Y. The electric motor for driving 41 is disposed so that a drive shaft thereof extends in the longitudinal direction Y, and the drive shaft of the electric motor for driving 41 passes through the rear wall 23 of the base stand 21 to be coupled to a screw part 44 of the ball screw mechanism 43 by a coupling mechanism 42. Due to this, at the time when the electric motor for driving 41 is driven, driving force of the electric motor for driving 41 is transmitted to the ball screw mechanism 43 from the drive shaft via the coupling mechanism 42, and the ball screw mechanism 43 can be rotated by the transmitted driving force.

The screw part 44 of the ball screw mechanism 43 is disposed to extend in the longitudinal direction Y to pass through substantially the center in the width direction X of the base stand 21, and a front end in the longitudinal direction Y is pivotably supported by the front wall 22 positioned at the front side of the base stand 21 in the longitudinal direction Y. A nut part 45 of the ball screw mechanism 43 is fixed to an upper surface of the base 5 on an inner side of the base stand 21. Due to this, in the propulsion mechanism 40, at the time when the electric motor for driving 41 is driven, the screw part 44 of the ball screw mechanism 43 is rotated by the driving force transmitted from the electric motor for driving 41, so that the screw part 44 can relatively move in an extending direction of the screw part 44 with respect to the nut part 45 fixed to the base 5. Thus, the propulsion mechanism 40 can move the base stand 21 supporting the screw part 44 in the longitudinal direction Y relative to the base 5 to which the nut part 45 is fixed, and move the frame 20 including the base stand 21 in the longitudinal direction Y on the first rails 6 disposed on the base 5. Due to this, the propulsion mechanism 40 can move the injection device 10 in the longitudinal direction Y.

The upper frame 30 is formed in a square frame body shape, and pivotably attached to a position in the vicinity of a front end of the base stand 21 in the longitudinal direction Y by a support pin 33. The upper frame 30 is also fixed in a state incapable of pivoting by a fixing screw 34 that fixes the upper frame 30 to the base stand 21 at a position other than the position where the support pin 33 is disposed. Due to this, the upper frame 30 is configured to be able to pivot about the support pin 33 as the center with respect to the base stand 21 when the fixing screw 34 is removed to release fixing by the fixing screw 34.

The upper frame 30 includes a front wall 31 disposed to rise upward from an attachment part to the base stand 21 in the upper and lower direction Z, and the heating barrel 50 is attached to the front wall 31 of the upper frame 30. The heating barrel 50 extends forward from the front wall 31 in the longitudinal direction Y, and a nozzle part 52 to be brought into close contact with the mold 16 (refer to FIG. 4) is disposed at a distal end of the heating barrel 50, that is, a front end of the heating barrel 50. Due to this, the heating barrel 50 is disposed above the frame 20 in the upper and lower direction Z and in front of the frame 20 in the longitudinal direction Y.

Specifically, the heating barrel 50 is formed in a substantially cylindrical shape, and disposed so that an axis direction thereof runs along the longitudinal direction Y. A heater 51 (refer to FIG. 4) such as a band heater is disposed thereon. Due to this, a resin material can be molten inside the heating barrel 50. That is, the temperature of the heating barrel 50 can be raised by the heater 51, and the resin material can be heated and molten to be molten resin as a plasticized material inside the heating barrel 50.

The screw 60 is disposed inside the heating barrel 50, and has a spiral shape the axis direction of which runs along the axis direction of the heating barrel 50. That is, the screw 60 includes a groove having a spiral shape on an outer peripheral surface. In this way, the screw 60 having the spiral shape can rotate about the axis as the center in the heating barrel 50. The screw 60 can move in an axis direction of rotation in the heating barrel 50. In other words, the screw 60 is disposed inside the heating barrel 50 so that a center axis of a cylinder as the shape of the heating barrel 50 is substantially aligned with a rotation axis of the screw 60, and disposed to be movable in the axis direction of the heating barrel 50. The screw 60 disposed rotatably in the heating barrel 50 can knead molten resin by rotating inside the heating barrel 50. Due to this, the heating barrel 50 is a barrel in which molten resin can be kneaded.

A hopper 55 is disposed in the vicinity of a portion of the heating barrel 50 on a side to be attached to the upper frame 30. The hopper 55 communicates with the inside of the heating barrel 50, and can supply pellets (not illustrated) as resin materials to be raw material resin to the heating barrel 50.

Furthermore, on the upper frame 30, second rails 35 are disposed on side walls 32 positioned on both sides in the width direction X of the upper frame 30. The second rails 35 extend in the longitudinal direction Y, that is, are formed to extend in substantially parallel with the heating barrel 50.

The rotation mechanism 70 is disposed behind the heating barrel 50 in the longitudinal direction Y, and can rotate the screw 60 disposed inside the heating barrel 50 about a center axis. The rotation mechanism 70 that rotates the screw 60 includes a rotation mechanism main body part 71, an electric motor for driving 73, a transmission belt 74, and a pulley 75. Among these, the rotation mechanism main body part 71 includes stays 72 extending in the width direction X, and the stays 72 are placed in a slidable manner on the second rails 35 at two points in the width direction X. Due to this, the rotation mechanism main body part 71 is placed on the second rails 35 in a movable manner via the stays 72.

The electric motor for driving 73 is placed above the rotation mechanism main body part 71. The pulley 75 is disposed in front of the rotation mechanism main body part 71, and disposed to be rotatable with respect to the rotation mechanism main body part 71 via a bearing 76. The pulley 75 is also coupled to a drive shaft of the electric motor for driving 73 via the transmission belt 74. Due to this, the pulley 75 can be rotated by driving force of the electric motor for driving 73 transmitted via the transmission belt 74. In this way, the pulley 75 that can be rotated by the driving force transmitted from the electric motor for driving 73 is fixed coaxially and integrally with the screw 60. In other words, a rear end side in the longitudinal direction Y of the screw 60 is coupled to the pulley 75. Due to this, the screw 60 disposed in the heating barrel 50 can be rotated integrally with the pulley 75 by the driving force transmitted from the electric motor for driving 73 to the pulley 75.

The forward/backward movement mechanism 80 is disposed in the rear of the rotation mechanism main body part 71 in the longitudinal direction Y. The forward/backward movement mechanism 80 can move the screw 60 disposed in the heating barrel 50 in the axis direction of the screw 60. That is, the screw 60 can be moved forward or backward in the longitudinal direction Y. Specifically, the forward/backward movement mechanism 80 includes an electric motor for driving 81, a transmission belt 83, a pulley 84, and a ball screw mechanism 86. Among these, the electric motor for driving 81 is disposed on a lateral side in the width direction X of the upper frame 30. The electric motor for driving 81 also includes an encoder 82 that detects a rotational position of the electric motor for driving 81, and a drive shaft of the electric motor for driving 81 is coupled to the pulley 84 via the transmission belt 83.

The pulley 84 is supported by the bearing 85 to be pivotable with respect to the upper frame 30. A screw part 87 of the ball screw mechanism 86 is integrally coupled to the pulley 84. The screw part 87 of the ball screw mechanism 86 is disposed coaxially with the screw 60, and also disposed coaxially with the pulley 75 included in the rotation mechanism main body part 71. A nut part 88 of the ball screw mechanism 86 included in the forward/backward movement mechanism 80 is formed in a substantially cylindrical shape, and the screw part 87 of the ball screw mechanism 86 is screwed to the nut part 88.

A load cell 90 is disposed between the nut part 88 of the ball screw mechanism 86 included in the forward/backward movement mechanism 80 and the rotation mechanism main body part 71 included in the rotation mechanism 70 in the longitudinal direction Y. The load cell 90 is disposed behind the rotation mechanism main body part 71 included in the rotation mechanism 70 and in front of the nut part 88 of the ball screw mechanism 86 included in the forward/backward movement mechanism 80.

The load cell 90 is a load measuring instrument that measures a load applied in the axis direction, and constituted of a strain body, a strain sensor attached to the strain body (both are not illustrated), and the like. In the present first embodiment, the load cell 90 is disposed so that the axis direction is aligned with the longitudinal direction Y, and formed in a substantially cylindrical shape that is flat in the longitudinal direction Y. An inner diameter of the cylinder is larger than an outer diameter of the screw part 87 of the ball screw mechanism 86 included in the forward/backward movement mechanism 80. In the load cell 90 formed as described above, a front surface in the longitudinal direction Y is integrally fixed to the rotation mechanism main body part 71 included in the rotation mechanism 70, and a rear surface in the longitudinal direction Y is integrally fixed to the nut part 88 of the ball screw mechanism 86 included in the forward/backward movement mechanism 80. The load cell 90 disposed between the rotation mechanism main body part 71 of the rotation mechanism 70 and the nut part 88 of the ball screw mechanism 86 included in the forward/backward movement mechanism 80 can detect a load working in the longitudinal direction Y between the rotation mechanism main body part 71 and the nut part 88.

Figure 4:
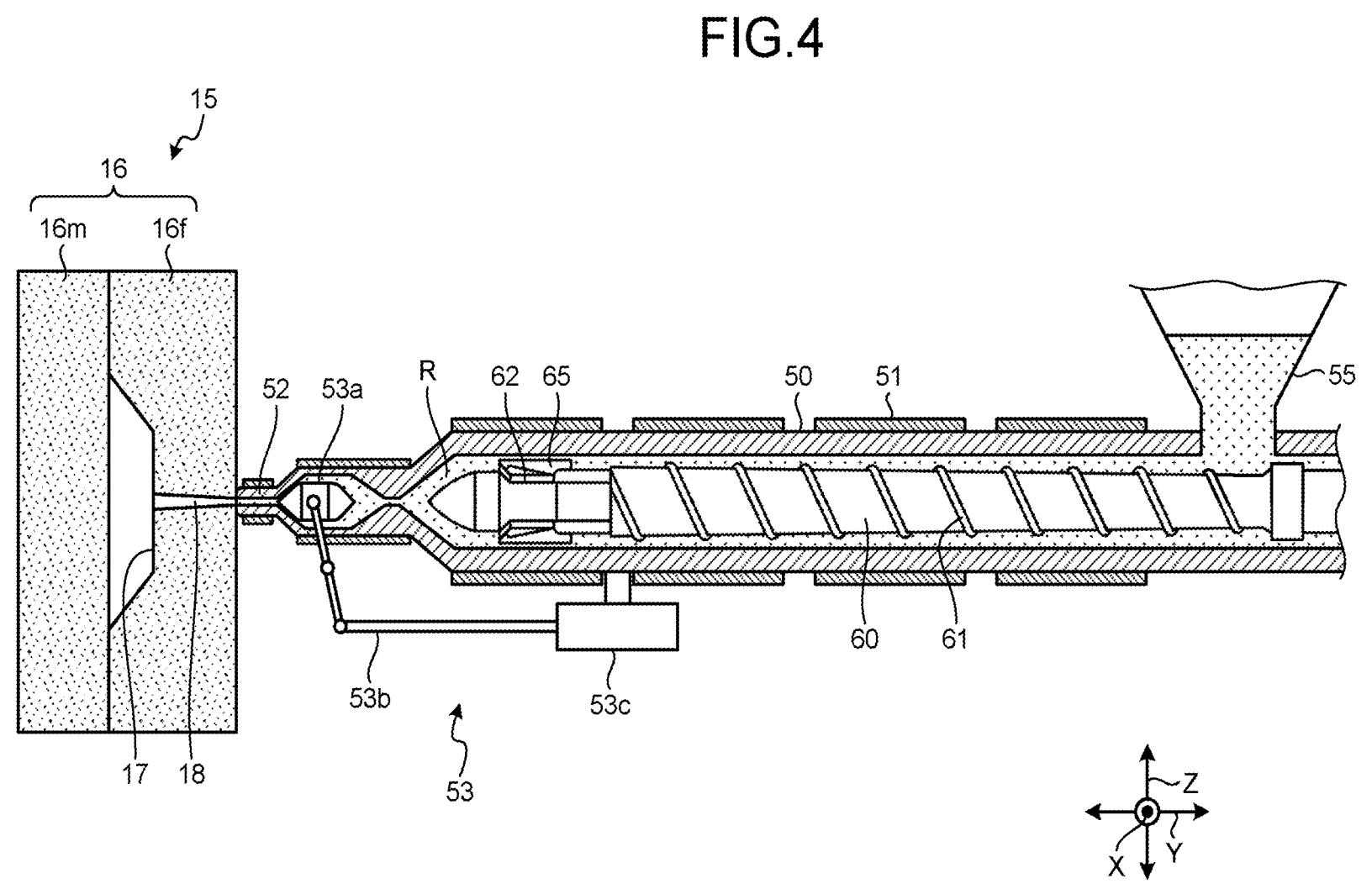

FIG. 4 is a detailed view of the heating barrel 50 illustrated in FIG. 2. As illustrated in FIG. 4, the heating barrel 50 is formed in a substantially cylindrical shape, and the heater 51 such as a band heater is disposed on the outer peripheral surface thereof. The nozzle part 52 is disposed at a front end in the longitudinal direction Y of the heating barrel 50. The nozzle part 52 is formed in a substantially cylindrical shape the inner diameter of which is smaller than an inner diameter of the heating barrel 50, and disposed while opening forward in the longitudinal direction Y of the heating barrel 50. In this way, the nozzle part 52 disposed at the front end of the heating barrel 50 can inject the molten resin in the heating barrel 50 into the cavity 17 formed by the mold 16 included in the mold clamping device 15.

The following describes the mold 16. The mold 16 includes a fixed mold 16*f* and a movable mold 16*m*, and the fixed mold 16*f* and the movable mold 16*m* are combined with each other to be the one mold 16 for molding the molten resin to be a molded article. Of the fixed mold 16*f* and the movable mold 16*m*, the fixed mold 16*f* is disposed on a side on which the heating barrel 50 is positioned in the longitudinal direction Y, and opposed to the nozzle part 52. The movable mold 16*m* is disposed on the opposite side of the side on which the heating barrel 50 is positioned in the longitudinal direction Y with respect to the fixed mold 16*f*. By moving the movable mold 16*m* in the longitudinal direction Y, the mold clamping device 15 can separate the movable mold 16*m* from the fixed mold 16*f*, or bring the movable mold 16*m* into contact with the fixed mold 16*f*.

The mold 16 including the fixed mold 16*f* and the movable mold 16*m* has a space between the fixed mold 16*f* and the movable mold 16*m* in a state in which the movable mold 16*m* is brought into contact with the fixed mold 16*f* and the fixed mold 16*f* and the movable mold 16*m* are combined with each other. In the mold 16, the space formed between the fixed mold 16*f* and the movable mold 16*m* in a state of being combined with each other is the cavity 17 for molding a molded article from the molten resin in the mold 16. A through hole 18 is formed on the fixed mold 16*f* as a hole passing through a surface on a side opposite to the nozzle part 52 and the cavity 17, and the heating barrel 50 can inject the molten resin in the heating barrel 50 into the cavity 17 by injecting the molten resin into the through hole 18 from the nozzle part 52.

A shut-off nozzle 53 for opening/closing the nozzle part 52 is further disposed on the heating barrel 50. The shut-off nozzle 53 includes an open/close part 53*a*, an open/close rod 53*b*, and an actuator 53*c*. Among these, the open/close part 53*a* is disposed in the vicinity of the nozzle part 52 on an inner side of the heating barrel 50, and can open and close the nozzle part 52 by moving in the longitudinal direction Y. That is, the open/close part 53*a* can open and close a hole that causes the inner side of the heating barrel 50 to communicate with an outer side at the nozzle part 52 from the inner side of the heating barrel 50.

The open/close rod 53*b* can move the open/close part 53*a* in the longitudinal direction Y by connecting the open/close part 53*a* with the actuator 53*c* and transmitting force output from the actuator 53*c* to the open/close part 53*a*.

The actuator 53*c* is a generation source of the force for moving the open/close part 53*a* in the shut-off nozzle 53, and disposed on the outer side of the heating barrel 50. The actuator 53*c* can open and close the nozzle part 52 by the open/close part 53*a* by transmitting the force generated by the actuator 53*c* to the open/close part 53*a* via the open/close rod 53*b*. As the actuator 53*c*, for example, a solenoid, an air cylinder, a hydraulic cylinder, or the like can be used, and any configuration may be employed so long as it can generate force for moving the open/close part 53*a*.

The screw 60 disposed in the heating barrel 50 includes a flight 61 that projects toward an outer side in a radial direction of the screw 60 and is formed in a spiral shape centered on the axis of the screw 60. Due to this, the screw 60 includes a groove-like portion having a spiral shape between adjacent winding portions of the flight 61 formed in a spiral shape.

A check ring 65 is disposed in the vicinity of a front end of the screw 60 formed in this way in the longitudinal direction Y. The check ring 65 is disposed on a groove part

62 that is formed in the vicinity of the front end of the screw 60 in the longitudinal direction Y. The groove part 62 is a groove having a groove width direction aligned with the axis direction of the screw 60, and being formed along a circumference in a circumferential direction of the screw 60.

Figure 5:
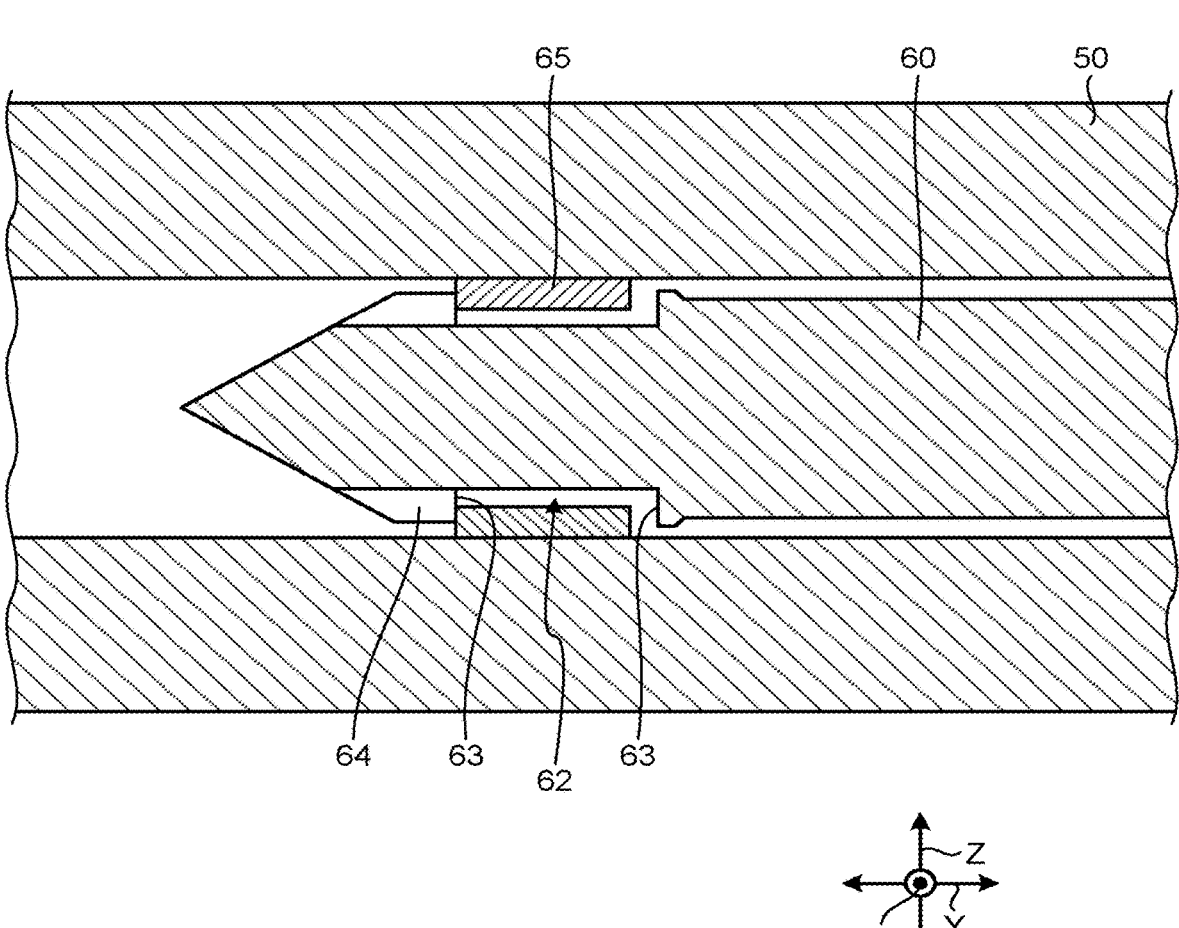
FIG. 5 is a detailed view of a check ring illustrated in FIG. 4.

FIG. 5 is a detailed view of the check ring 65 illustrated in FIG. 4. The check ring 65 is formed in a substantially cylindrical shape, and disposed in the groove part 62 of the screw 60 so that the axis thereof is substantially aligned with the axis of the screw 60. An outer diameter of the check ring 65 formed in a substantially cylindrical shape is substantially the same as the inner diameter of the heating barrel 50, and is slightly smaller than the inner diameter of the heating barrel 50. An inner diameter of the check ring 65 is larger than a diameter of a groove bottom of the groove part 62 of the screw 60, and a clearance is formed between an inner peripheral surface of the check ring 65 and the groove bottom of the groove part 62 of the screw 60. A width in the axis direction of the check ring 65 is smaller than a groove width of the groove part 62 of the screw 60. Due to this, the check ring 65 can move in the groove width direction in the groove part 62.

On the screw 60, a communicating part 64 is formed to cause the inside of the groove part 62 to communicate with a portion in front of the groove part 62 in the longitudinal direction Y. The communicating part 64 opens in the groove wall 63 at the front side of the groove part 62 in the groove width direction.

The injection molding machine 1 for foam molding also includes a control unit 100 that performs various kinds of control for the injection molding machine 1 for foam molding. The control unit 100 includes a central processing unit (CPU) that performs arithmetic processing, a random access memory (RAM) and a read only memory (ROM) each functioning as a memory that stores various kinds of information, and the like. All or part of functions of the control unit 100 are implemented by loading an application program held in the ROM into the RAM to be executed by the CPU, and reading out and writing data from/into the RAM and the ROM.

The display unit 101 and the input unit 102 are both connected to the control unit 100, and the display unit 101 displays information transmitted from the control unit 100. The input unit 102 transmits information on which an input operation is performed to the control unit 100. The encoder 82 disposed on the electric motor for driving 81 of the forward/backward movement mechanism 80 and the load cell 90 disposed between the forward/backward movement mechanism 80 and the rotation mechanism 70 are connected to the control unit 100, and can transmit a detection result to the control unit 100. Furthermore, the heater 51 included in the injection device 10, the actuator 53*c* of the shut-off nozzle 53, the electric motor for driving 73 of the rotation mechanism 70, the electric motor for driving 81 of the forward/backward movement mechanism 80, and an electric motor for driving 41 included in the propulsion mechanism 40 are connected to the control unit 100, and are operated by a control signal from the control unit 100. That is, the control unit 100 can control operations of the heating barrel 50, the screw 60, and the shut-off nozzle 53.

<Effect of Injection Molding Machine 1 for Foam Molding>

The injection molding machine 1 for foam molding according to the present first embodiment includes the configuration as described above. The following describes an effect thereof. The injection molding machine 1 for foam molding repeatedly performs a cycle of an injection/molding operation assuming one time of injection/molding operation as one cycle. Each cycle includes a plurality of processes for injecting the resin material used for molding and molding a product. Each cycle includes, for example, an injection process, a cooling process, a mold opening process, a taking-out process, an intermediate process, a mold closing process, and a measurement process.

The injection process is a process of pressing the nozzle part 52 disposed on the heating barrel 50 of the injection device 10 against the through hole 18 of the fixed mold 16f included in the mold clamping device 15, and injecting molten resin as a resin material molten by the heating barrel 50 into the cavity 17 formed by the movable mold 16m and the fixed mold 16f.

The cooling process is a process in which a temperature of molded resin is lowered and the molded resin is solidified, the molded resin as the resin material injected into the cavity 17 formed by the fixed mold 16f and the movable mold 16m included in the mold clamping device 15, and a process of standing by for a certain time until the molded resin becomes a molded article.

The mold opening process is a process of separating the movable mold 16m from the fixed mold 16f to take out the molded article molded by the movable mold 16m and the fixed mold 16f included in the mold clamping device 15.

The taking-out process is a process of ejecting the molded article from the movable mold 16m by an ejection member (not illustrated) included in the mold clamping device 15 to remove the molded article from the movable mold 16m.

The intermediate process is a process of moving, to a predetermined position, and acquiring the molded article ejected from the movable mold 16m.

The mold closing process is a process of combining the movable mold 16m with the fixed mold 16f included in the mold clamping device 15 to form the cavity 17 as a space corresponding to a product shape between the movable mold 16m and the fixed mold 16f.

The measurement process is a process of feeding the molten resin to be injected in the next cycle toward the end at which the nozzle part 52 of the heating barrel 50 included in the injection device 10 is positioned, and preparing the resin material to be used in the next cycle. The measurement process is performed in a period in which the cooling process is performed by the mold clamping device 15.

In molding the molded article by the injection molding machine 1 for foam molding, the cycle of these injection/molding operations is repeatedly performed. To smoothly inject the resin material inside the heating barrel 50 in the repeatedly performed cycle, the control unit 100 continuously heats the inside of the heating barrel 50 by the heater 51. Due to this, the heating barrel 50 holds the resin material, which is put into the hopper 55 in a state of pellets and supplied to the heating barrel 50 from the hopper 55, in a molten state.

The control unit 100 performs control while determining a start timing or an end timing of each process in the cycle of the injection/molding operation. To determine the start timing or the end timing of each process, for example, a flag is defined in advance for the first step or the last step of each process in a computer program for causing the control unit 100 to operate the injection molding machine 1 for foam molding. Due to this, the control unit 100 can determine the start timing or the end timing of each process during execution of the computer program for causing the injection molding machine 1 for foam molding to operate. That is, by defining the flag, the control unit 100 can determine that the process proceeds to the next process when the flag is executed before the processing or after the processing of a step in each process.

When the process proceeds, the control unit 100 causes the display unit 101 to display proceeding of the process. That is, the display unit 101 displays a current process of the injection molding machine 1 for foam molding. Due to this, the operator can recognize a current operation state of the injection molding machine 1 for foam molding by visually recognizing the display unit 101.

Assuming that the processes described above are basic processes, the injection molding machine 1 for foam molding can mold a molded article from the molten resin by repeating these processes, but the injection molding machine 1 for foam molding according to the present first embodiment can mold a foam molded article from molten resin containing air bubbles. Next, the following describes a foam molding method for molding the foam molded article.

<Method of Foam Molding>

In the foam molding method according to the present first embodiment, in molding the foam molded article, the air is taken into the heating barrel 50, the taken-in air is dispersed in the molten resin in the heating barrel 50 to be air bubbles, and a pressure is applied to the molten resin to cause the air bubbles to be in a state of supercritical fluid. Thereafter, the molten resin containing the air bubbles in the state of supercritical fluid is injected into the cavity 17 of the mold 16, foam molding is performed when the pressure of the molten resin is lowered and the air bubbles grow, and a foam molded article is molded. In performing such foam molding by the foam molding method as described above using the injection molding machine 1 for foam molding, movement in the longitudinal direction Y of the heating barrel 50 by the propulsion mechanism 40, movement in the longitudinal direction Y of the screw 60 by the forward/backward movement mechanism 80, and opening/closing of the nozzle part 52 by the shut-off nozzle 53 are switchingly performed.

Figure 6:
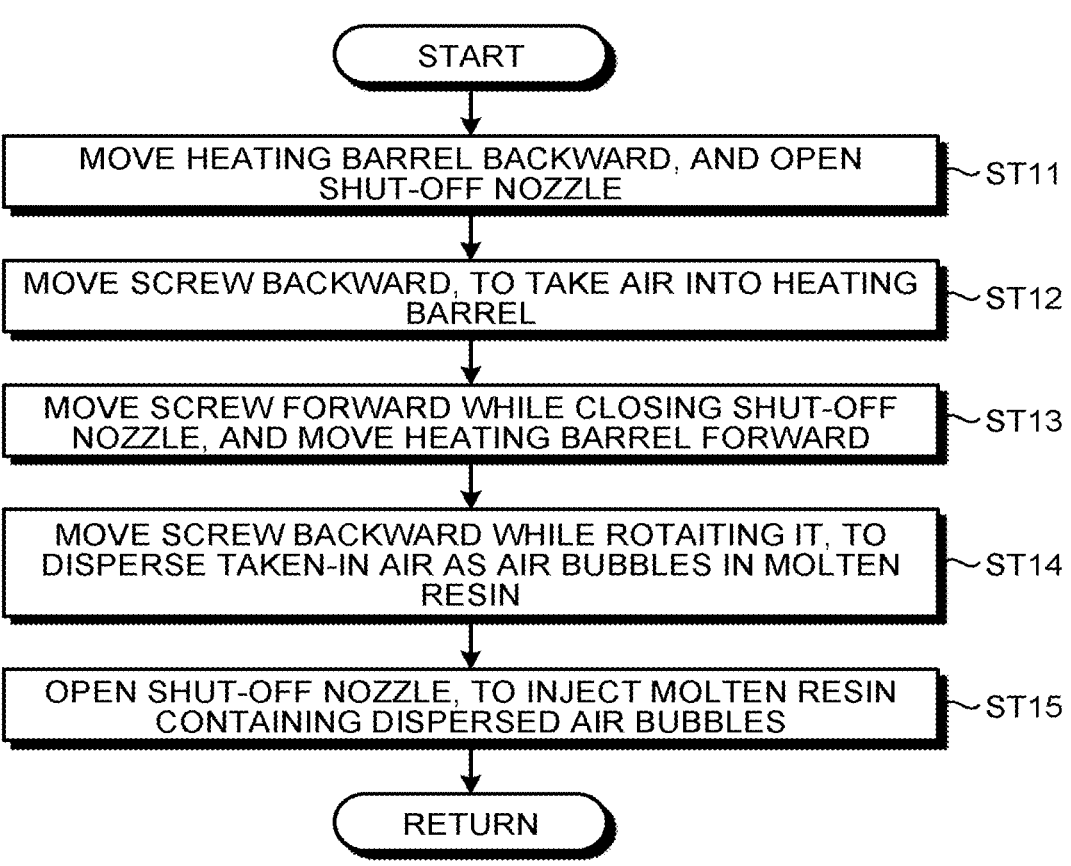
FIG. 6 is a flowchart illustrating a procedure in performing foam molding using the injection molding machine for foam molding according to the first embodiment.
Figure 7:
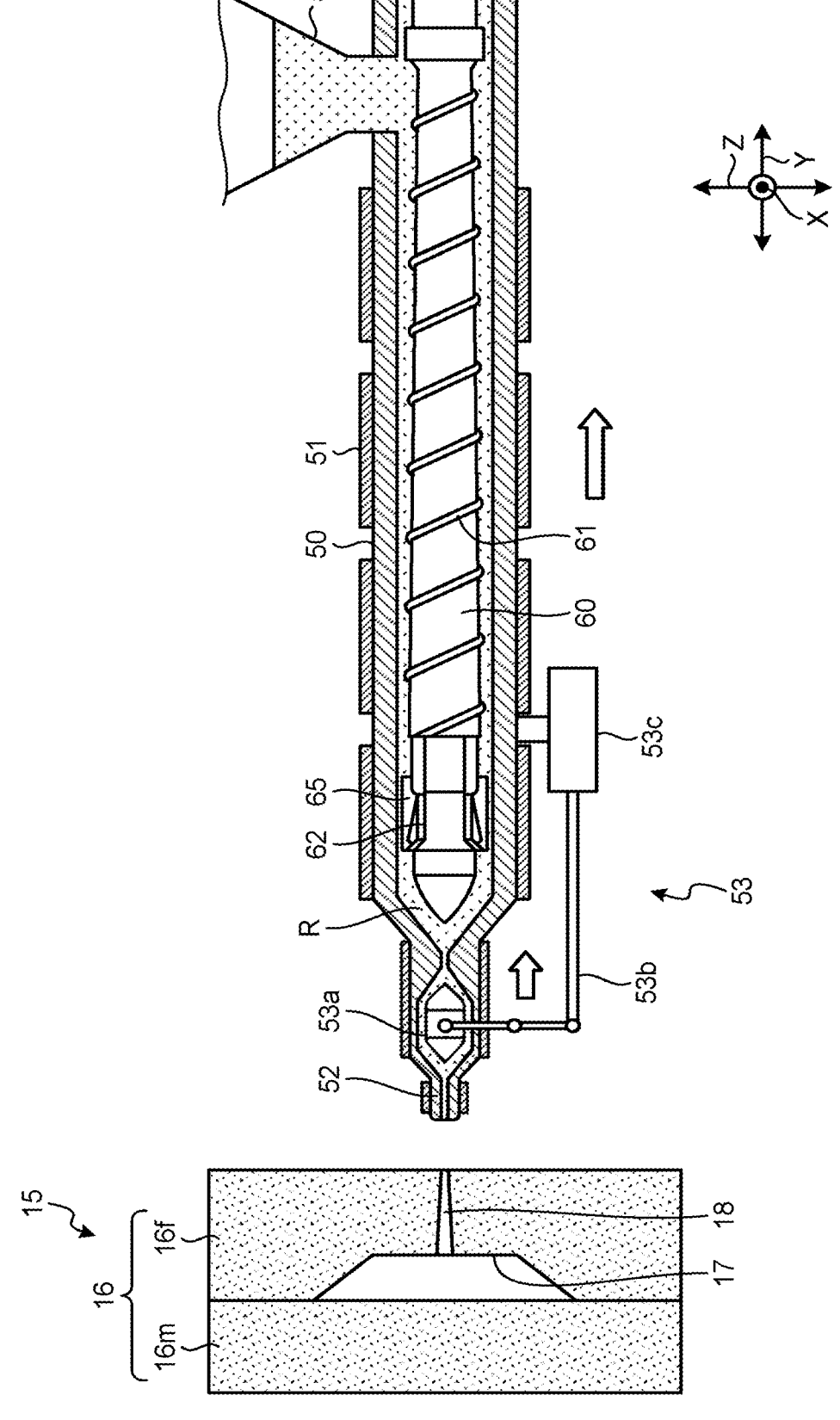
FIG. 7 is a schematic diagram illustrating a state in which the heating barrel is moved backward.

FIG. 6 is a flowchart illustrating a procedure in performing foam molding using the injection molding machine 1 for foam molding according to the first embodiment. FIG. 7 is a schematic diagram illustrating a state in which the heating barrel 50 is moved backward. In performing foam molding using the injection molding machine 1 for foam molding according to the first embodiment, first, the heating barrel 50 is moved backward, and the shut-off nozzle 53 is opened (Step ST11). Specifically, for the heating barrel 50, the propulsion mechanism 40 is made to operate to move the injection device 10 in the longitudinal direction Y by, and the injection device 10 is moved backward so that the heating barrel 50 included in the injection device 10 is moved backward. At the time when the injection device 10 is moved by the propulsion mechanism 40, the electric motor for driving 41 included in the propulsion mechanism 40 is driven, and the driving force generated in the electric motor for driving 41 is transmitted to the screw part 44 of the ball screw mechanism 43 via the coupling mechanism 42 to rotate the screw part 44. Due to this, the screw part 44 is moved in the longitudinal direction Y relatively to the nut part 45 of the ball screw mechanism 43 fixed to the base 5, and the entire injection device 10 is moved in the longitudinal direction Y while being supported by the first rail 6. In this way, by moving the injection device 10 in the longitudinal direction Y by the propulsion mechanism 40, the nozzle part 52 of the heating barrel 50 included in the injection device 10 is slightly separated from the mold 16.

By causing the actuator 53c of the shut-off nozzle 53 to operate to open the shut-off nozzle 53, the nozzle part 52 is brought into an open state. That is, by causing the actuator 53c of the shut-off nozzle 53 to operate, and transmitting force generated in the actuator 53c to the open/close part 53a in the heating barrel 50 by the open/close rod 53b, the open/close part 53a is separated from the hole of the nozzle part 52 to open the hole of the nozzle part 52. Due to this, the inside of the heating barrel 50 is made to communicate with the atmosphere on the outside of the heating barrel 50 via the hole of the nozzle part 52.

Figure 8:
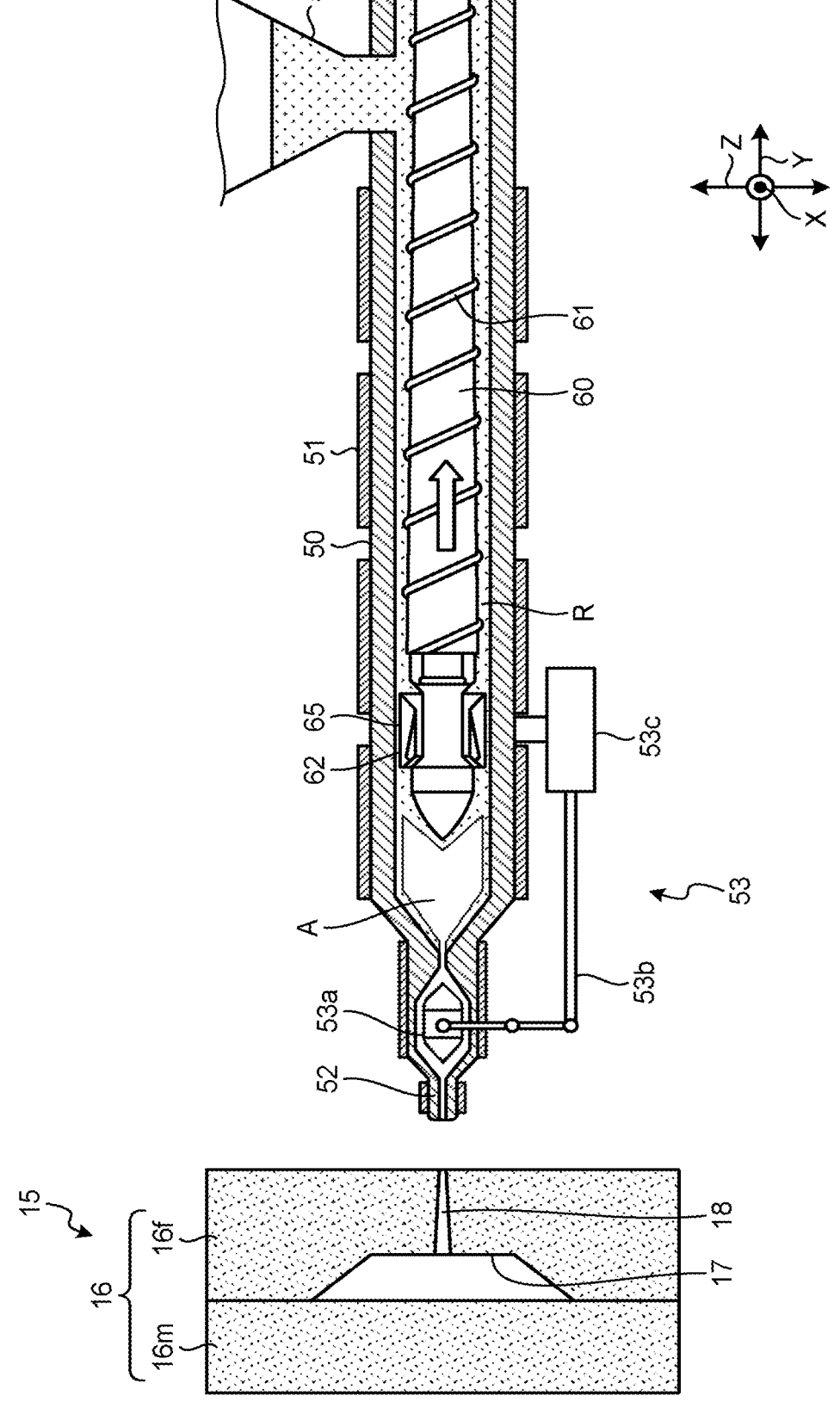
FIG. 8 is a schematic diagram illustrating a state in which a screw is moved backward.

FIG. 8 is a schematic diagram illustrating a state in which the screw 60 is moved backward. Next, the screw 60 is moved backward, and the air is taken into the heating barrel 50 (Step ST12). That is, by causing the forward/backward movement mechanism 80 to operate and moving the screw 60 in the longitudinal direction Y in a state in which the shut-off nozzle 53 is opened, the screw 60 is moved backward. At the time when the screw 60 is moved backward by the forward/backward movement mechanism 80, the electric motor for driving 81 included in the forward/backward movement mechanism 80 is driven, the driving force generated in the electric motor for driving 81 is transmitted to the pulley 84 by the transmission belt 83, and further transmitted from the pulley 84 to the screw part 87 of the ball screw mechanism 86 to rotate the screw part 87. Due to this, the nut part 88 of the ball screw mechanism 86 is moved in the longitudinal direction Y, and the load cell 90 and the entire rotation mechanism 70 are moved in the longitudinal direction Y while being supported by the second rail 35 together with the nut part 88. Due to this, the screw 60 coupled to the pulley 75 of the rotation mechanism 70 also moves in the longitudinal direction Y together with the pulley 75 of the rotation mechanism 70, and the screw 60 moves backward.

In taking air A into the heating barrel 50, as described above, by moving the screw 60 backward, the air A, that is, the air present around the heating barrel 50, is taken into the heating barrel 50 from the nozzle part 52. Specifically, the check ring 65 formed to have substantially the same outer diameter as the inner diameter of the heating barrel 50 is disposed on the screw 60, so that, in a case in which the screw 60 is moved backward, a portion in front of the screw 60 in the heating barrel 50 has negative pressure. Due to this, in a case in which the screw 60 is moved backward, the air A enters the nozzle part 52 due to the negative pressure generated in the portion in front of the check ring 65, and the air A is taken into the portion in front of the check ring 65 in the heating barrel 50.

A backward movement amount of the screw 60 at the time of moving the screw 60 backward to take the air A into the heating barrel 50 is preferably adjusted in accordance with an amount of air bubbles required for the foam molded article to be molded.

Figure 9:
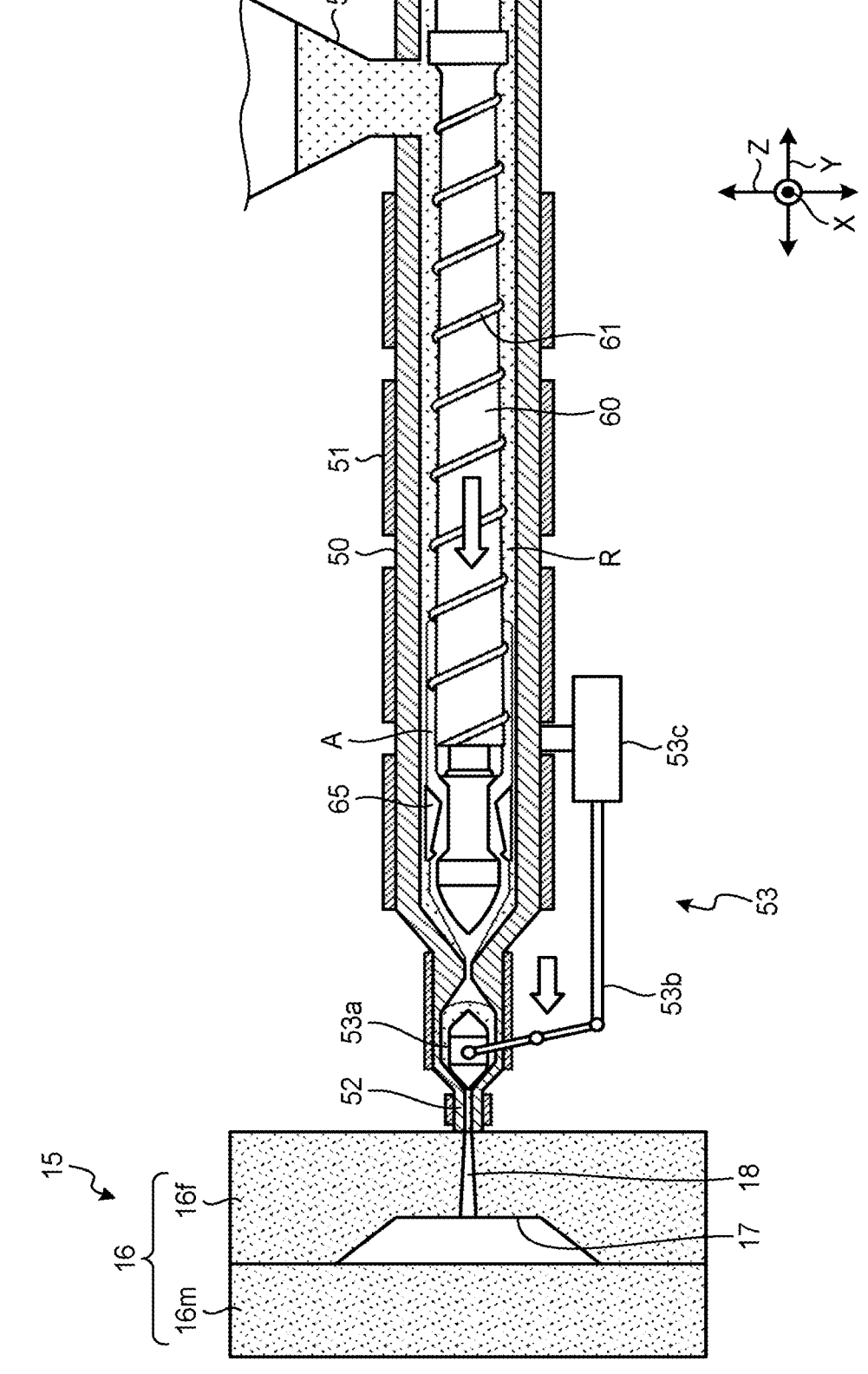
FIG. 9 is a schematic diagram illustrating a state in which the screw is moved forward while a shut-off nozzle is closed.

FIG. 9 is a schematic diagram illustrating a state in which the screw 60 is moved forward while the shut-off nozzle 53 is closed. Next, the screw 60 is moved forward while the shut-off nozzle 53 is closed, and the heating barrel 50 is moved forward (Step ST13). That is, in a state in which the nozzle part 52 is closed by causing the actuator 53c of the shut-off nozzle 53 to operate and closing the shut-off nozzle 53, by causing the forward/backward movement mechanism 80 to operate and moving the screw 60 in the longitudinal direction Y, the screw 60 is moved forward. Due to this, the air A taken into the heating barrel 50 is diffused in molten resin R in the heating barrel 50. Specifically, at the time of molding the molded article by the injection molding machine 1 for foam molding, the resin material is held in the heating barrel 50 in a molten state, so that the molten resin R is stored in a portion behind the check ring 65 in the heating barrel 50.

On the other hand, the air A is taken into the portion in front of the check ring 65 in the heating barrel 50, so that, in a case in which the screw 60 is moved forward while the nozzle part 52 is closed, the air A taken into the portion in front of the check ring 65 is compressed by the screw 60 that is moved forward. Due to this, the air A taken into the portion in front of the check ring 65 passes through a portion at which the check ring 65 is disposed, and flows to the portion behind the check ring 65. That is, the air A positioned in front of the check ring 65 in the heating barrel 50 passes through the communicating part 64 formed on the screw 60, passes through the clearance between the inner peripheral surface of the check ring 65 and the groove bottom of the groove part 62 of the screw 60, passes through between the screw 60 and the groove wall 63 behind the groove part 62 of the screw 60, and flows to the portion behind the check ring 65. Due to this, the air A taken into the heating barrel 50 is diffused in the molten resin R that is positioned in the portion behind the check ring 65.

Further, for the heating barrel 50, the propulsion mechanism 40 is made to operate to move the injection device 10 in the longitudinal direction Y, and the injection device 10 is moved forward so that the heating barrel 50 included in the injection device 10 is moved forward. Due to this, the nozzle part 52 of the heating barrel 50 is brought into contact with the mold 16, and the nozzle part 52 of the heating barrel 50 is made to communicate with the through hole 18 formed on the fixed mold 16f. Any of the operation of forward movement of the screw 60 and the operation of forward movement of the heating barrel 50 may be performed first, and both operations may be performed at the same time.

Figure 10:
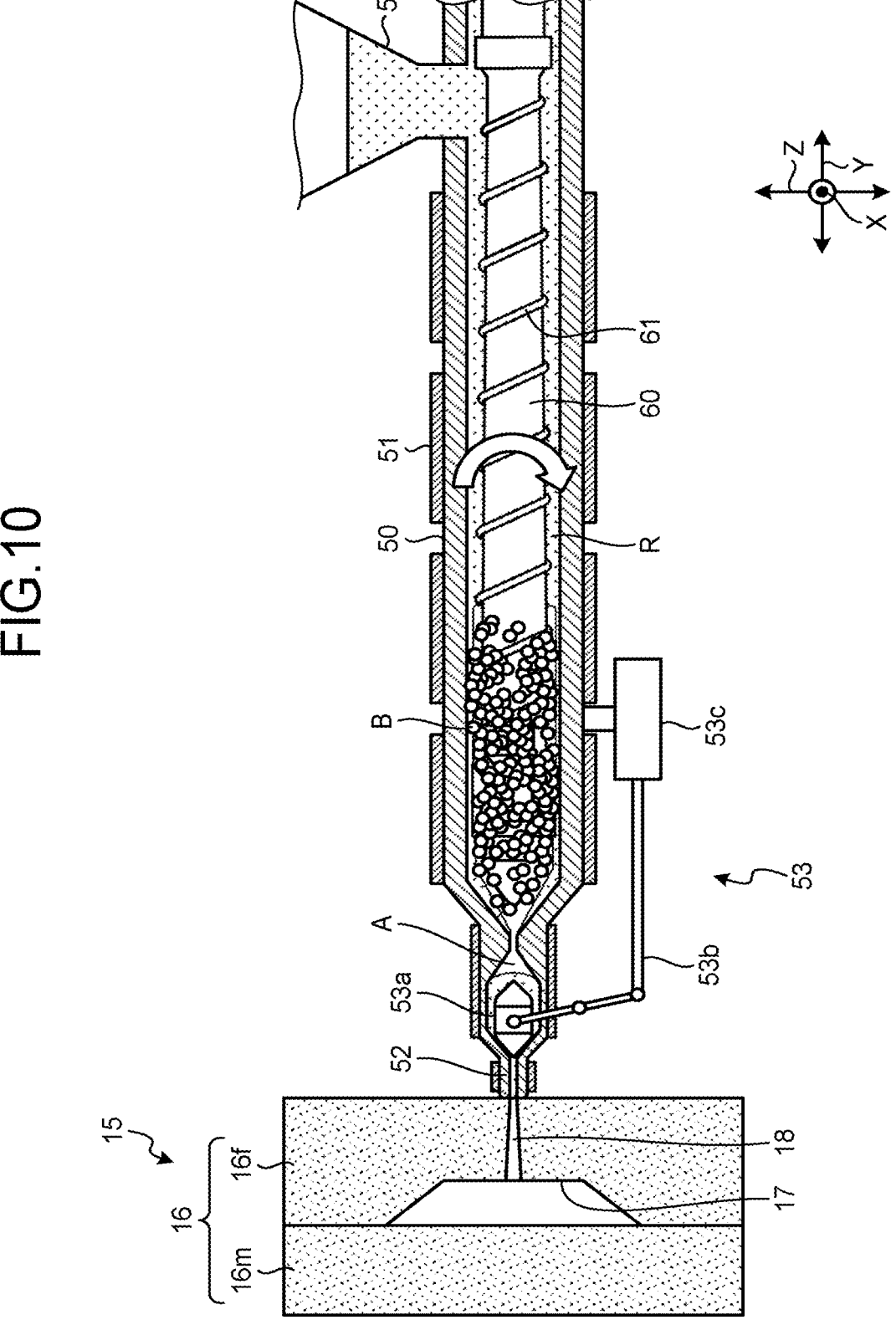
FIG. 10 is an explanatory diagram illustrating a state in which the screw is moved backward while being rotated.

FIG. 10 is an explanatory diagram illustrating a state in which the screw 60 is moved backward while being rotated. Next, the screw 60 is moved backward while being rotated, and the taken-in air A is dispersed as air bubbles B in the molten resin R (Step ST14). That is, in a state in which the shut-off nozzle 53 is closed, the screw 60 is rotated by causing the rotation mechanism 70 to operate while the screw 60 is moved in the longitudinal direction Y by causing the forward/backward movement mechanism 80 to operate, and the screw 60 is moved backward. At the time of rotating the screw 60 by the rotation mechanism 70, the screw 60 is rotated when the electric motor for driving 73 included in the rotation mechanism 70 is driven, the driving force generated in the electric motor for driving 73 is transmitted to the pulley 75 by the transmission belt 74, and the driving force is transmitted from the pulley 75 to the screw 60.

In this way, in a case of rotating the screw 60 by the rotation mechanism 70, the molten resin R in the heating barrel 50 is kneaded by rotation of the screw 60, so that the air A, which has flowed rearward of the check ring 65 in the heating barrel 50 and has been diffused in the molten resin R, is divided into fine air bubbles B when the molten resin R is kneaded. Due to this, the air A diffused in the molten resin R in the heating barrel 50 is dispersed in the molten resin R as the air bubbles B.

In a case in which the screw 60 is moved backward while being rotated as described above, a rotation direction of the screw 60 is a rotation direction with which the molten resin R present between adjacent winding portions of the flight 61 included in the screw 60 can be fed forward in the longitudinal direction Y by rotation of the screw 60.

The molten resin R, which is fed forward when the screw 60 is rotated, passes through the portion in which the check ring 65 is disposed, and is fed to the portion in front of the check ring 65. That is, the molten resin R positioned behind the check ring 65 passes through between the screw 60 and the groove wall 63 behind the groove part 62 of the screw 60, passes through the clearance between the inner periph- eral surface of the check ring 65 and the groove bottom of the groove part 62 of the screw 60, passes through the communicating part 64 formed on the screw 60, and flows to the portion in front of the check ring 65. Due to this, the molten resin R in which the air bubbles B are dispersed is ejected in front of the check ring 65 in the heating barrel 50, that is, toward a distal end that is an end of the heating barrel 50 at which the nozzle part 52 is positioned. As described above, when the screw 60 is moved backward while being rotated, the air A taken into the heating barrel 50 is dispersed in the molten resin R as the air bubbles B, and the molten resin R is fed forward.

A process of feeding the molten resin R in the heating barrel 50 to the distal end side of the heating barrel 50 is a measurement process performed by the injection molding machine 1 for foam molding. In the measurement process, the molten resin R to be injected to the cavity 17 formed in the mold 16 in one injection process is measured, and the molten resin R is secured in a portion on the distal end side in the heating barrel 50. Specifically, in the measurement process, the molten resin R is measured based on a move- ment amount at the time when the screw 60 is moved backward or a position of the screw 60 in the longitudinal direction Y in the heating barrel 50, and the pressure of the molten resin R fed to the portion on the distal end side in the heating barrel 50.

Regarding control in the measurement process, a move- ment amount of the screw 60 is acquired based on a detection result of the encoder 82 included in the electric motor for driving 81 of the forward/backward movement mechanism 80. That is, the forward/backward movement mechanism 80 moves the screw 60 in the longitudinal direction Y by transmitting the driving force generated in the electric motor for driving 81 to the screw 60, and the encoder 82 can detect a rotational position of a rotating body (not illustrated) included in the electric motor for driving 81. Thus, the control unit 100 acquires a position in the longi- tudinal direction Y of the screw 60 by acquiring the rota- tional position of the rotating body of the electric motor for driving 81 detected by the encoder 82.

The encoder 82 included in the electric motor for driving 81 of the forward/backward movement mechanism 80 serves as a screw position detection unit that detects the position in the longitudinal direction Y of the screw 60 in the heating barrel 50. In the measurement process, the control unit 100 acquires a backward movement amount of the screw 60 by acquiring the position in the longitudinal direction Y of the screw 60 based on the detection result of the encoder 82 included in the electric motor for driving 81 of the forward/backward movement mechanism 80.

The pressure of the molten resin R fed to the portion on the distal end side in the heating barrel 50 is detected by using a detection result of the load cell 90. The load cell 90 is used as a back pressure detection unit that detects a back pressure, which is the pressure of the molten resin R that is ejected to the distal end side by the screw 60, in the heating barrel 50.

The following describes detection of the back pressure of the molten resin R by the load cell 90. In a case of ejecting the molten resin R in the heating barrel 50 to the distal end side in the heating barrel 50 by the screw 60, rearward force in the longitudinal direction Y works on the screw 60 due to a counteraction at the time when the molten resin R is ejected forward. The force in the longitudinal direction Y that has worked on the screw 60 is transmitted from the screw 60 to the pulley 75 of the rotation mechanism 70, and further transmitted from the pulley 75 to the rotation mecha- nism main body part 71 to be transmitted to the load cell 90 fixed to the rotation mechanism main body part 71.

A surface of the load cell 90 on the opposite side of a surface fixed to the rotation mechanism main body part 71 is fixed to the nut part 88 of the ball screw mechanism 86 included in the forward/backward movement mechanism 80, so that the rearward force in the longitudinal direction Y from the rotation mechanism main body part 71 of the rotation mechanism 70 to the load cell 90 works as force of compressing the load cell 90 in the longitudinal direction Y. The load cell 90 detects magnitude of the force working on the load cell 90 as described above, and transmits it to the control unit 100. The control unit 100 acquires the magni- tude of the force transmitted from the load cell 90 as force working in the longitudinal direction Y on the screw 60.

In the measurement process, the control unit 100 acquires the back pressure of the molten resin R that is ejected forward by the screw 60 by acquiring the magnitude of the force working in the longitudinal direction Y on the screw 60 based on the detection result of the load cell 90. That is, in the measurement process, the control unit 100 acquires the amount of the molten resin R ejected to the distal end side as a side on which the nozzle part 52 of the heating barrel 50 is positioned, and measures the molten resin R by acquiring the position in the longitudinal direction Y of the screw 60 based on the detection result of the encoder 82 and acquiring the back pressure of the molten resin R based on the detection result of the load cell 90. In this way, in the measurement process, a certain amount of the molten resin R is measured, the certain amount of the molten resin R to be injected to the cavity 17 of the mold 16 included in the mold clamping device 15 from the heating barrel 50 in one injection process.

In the measurement process, as described above, the back pressure is generated in the molten resin R when the molten resin R in the heating barrel 50 is ejected forward, that is, the distal end side in the heating barrel 50 by rotation of the screw 60, and the molten resin R contains the air bubbles B. Due to this, the pressure also works on the air bubbles B, the pressure that works on the molten resin R when the molten resin R is ejected by rotation of the screw 60.

At this point, air contained in the air bubbles B is brought into a supercritical state by the pressure working on the air bubbles B from the molten resin R. Thus, the back pressure of the molten resin R in the measurement process is set to be a pressure that can bring the air contained in the air bubbles B into the supercritical state, for example, the back pressure is set to be equal to or higher than 3.7 MPa. That is, in the measurement process, the control unit 100 controls the rotation mechanism 70 and the forward/backward move- ment mechanism 80 so that the back pressure of the molten resin R that is acquired based on the detection result of the load cell 90 is equal to or higher than 3.7 MPa.

Figure 11:
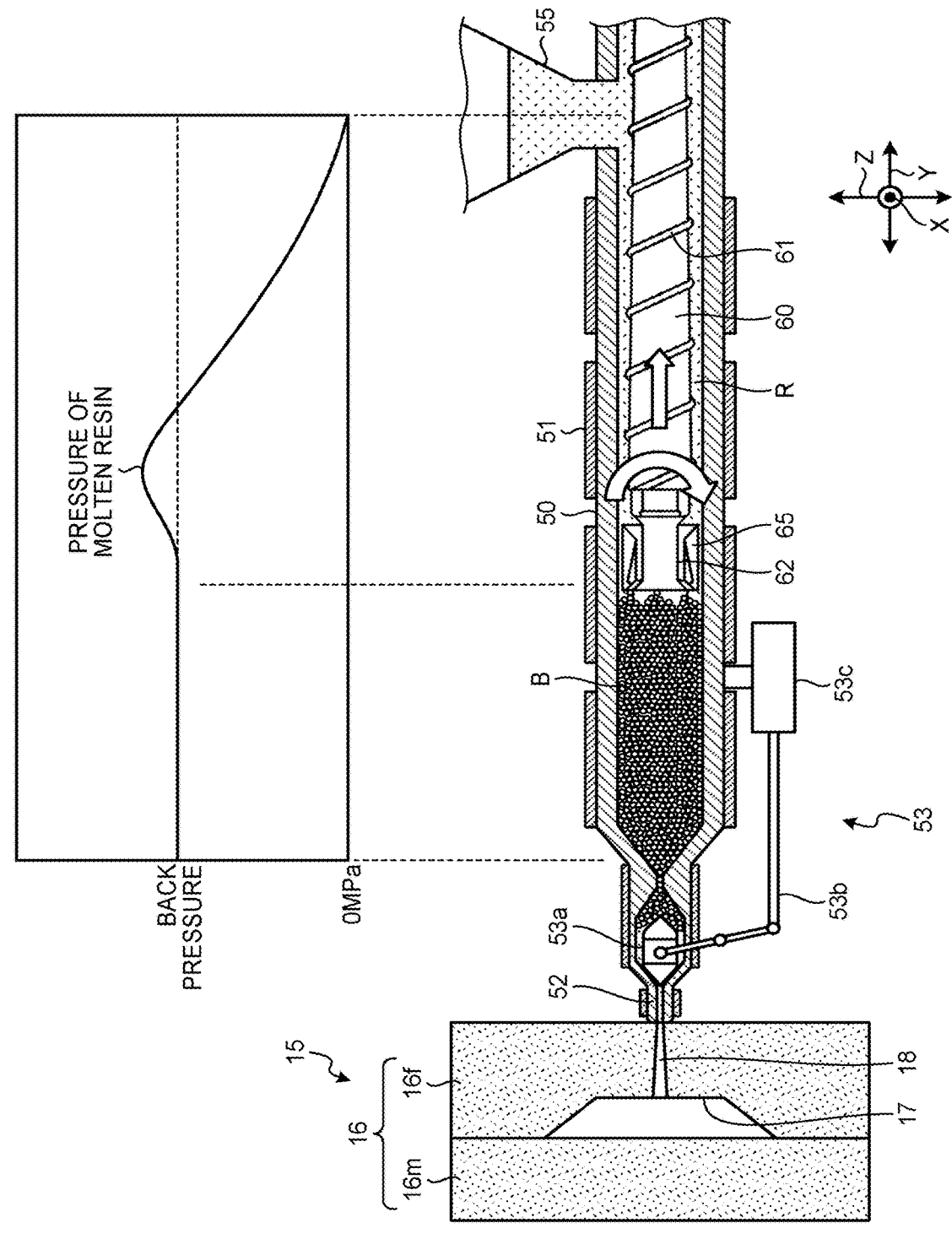
FIG. 11 is an explanatory diagram of pressure distribution of molten resin in the heating barrel in a measurement process.

FIG. 11 is an explanatory diagram of pressure distribution of the molten resin R in the heating barrel 50 in the measurement process. Herein, the pellets as the resin mate- rial can be continuously supplied from the hopper 55 into the heating barrel 50, and the heating barrel 50 is opened to the surrounding air via the hopper 55. On the other hand, during the measurement process, the molten resin R in the heating barrel 50 is entirely pushed forward in the longitudinal direction Y by the screw 60. Due to this, the pressure of the molten resin R becomes maximum in the vicinity of the center of the screw 60 in the longitudinal direction Y. The pressure is lower on the rear side in the longitudinal direction Y, that is, a side on which the hopper 55 is positioned, but a high pressure state is secured on the front side in the longitudinal direction Y, so that a set back pressure is secured in front of the check ring 65.

As described above, the molten resin R in the heating barrel 50 is entirely pushed forward by the screw 60, so that a high pressure is secured in the portion on the distal end side in the heating barrel 50 even in a state in which the heating barrel 50 is opened to the surrounding air via the hopper 55.

Figure 12:
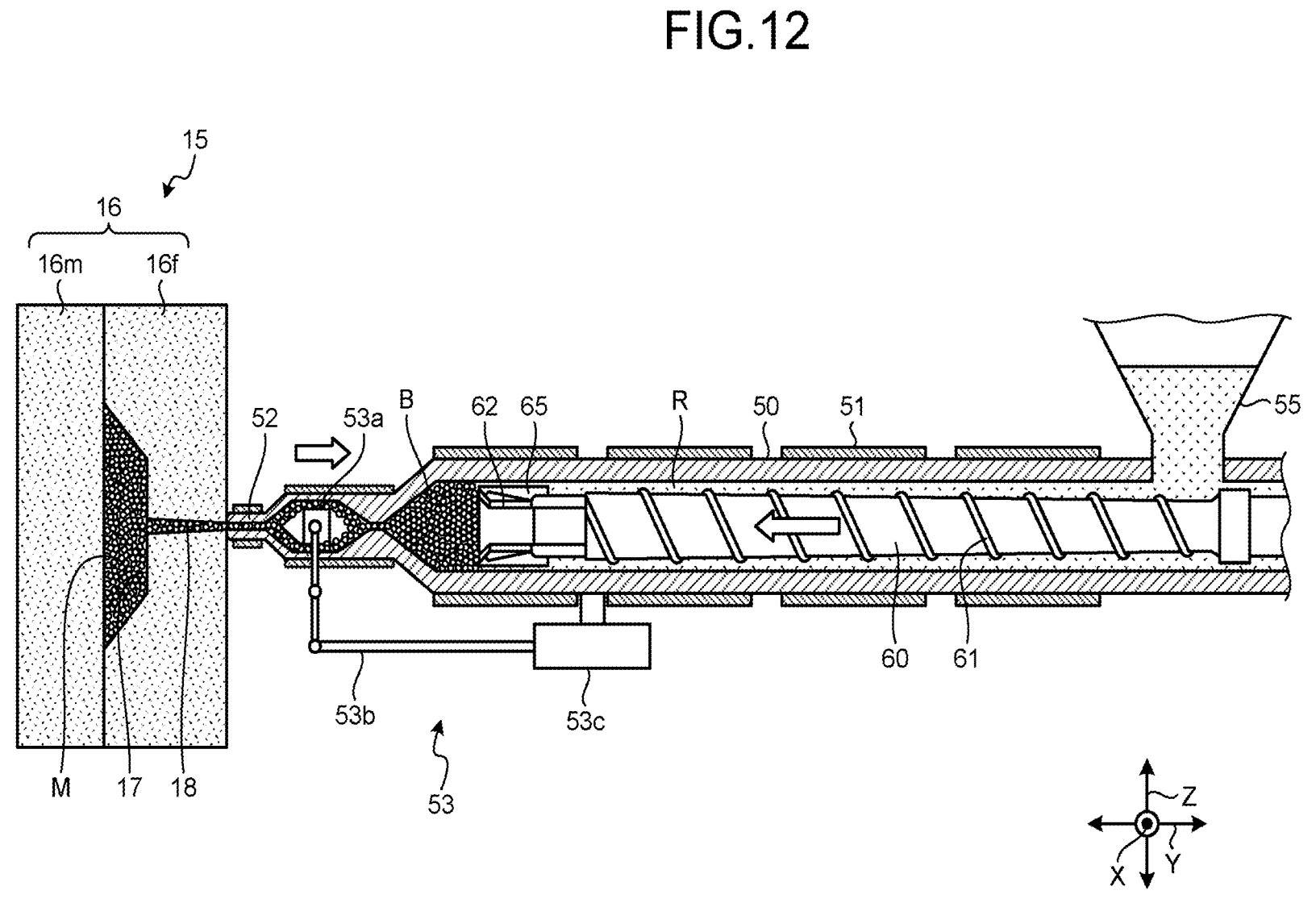

FIG. 12 is an explanatory diagram illustrating a state in which the measured molten resin R is injected. Next, the shut-off nozzle 53 is opened, and the molten resin R containing the dispersed air bubbles B is injected into the cavity 17 (Step ST15). That is, the molten resin R measured in the heating barrel 50 in the measurement process is injected into the cavity 17 formed in the mold 16 in the injection process. In injecting the molten resin R into the cavity 17, first, the actuator 53c of the shut-off nozzle 53 is made to operate to open the shut-off nozzle 53, and the nozzle part 52 is opened to cause the hole of the nozzle part 52 to communicate with the through hole 18 formed on the fixed mold 16f.

After the shut-off nozzle 53 is opened, the forward/backward movement mechanism 80 is made to operate to move the screw 60 forward. Due to this, the molten resin R, which is positioned in front of the screw 60 in the heating barrel 50 and measured in the measurement process, is ejected from the nozzle part 52 by the screw 60, and injected into the cavity 17 formed in the mold 16.

Herein, the check ring 65 having substantially the same outer diameter as the inner diameter of the heating barrel 50 is disposed on the screw 60, and there is a clearance between the inner peripheral surface of the check ring 65 and the screw 60. Due to this, when the screw 60 is rotated in the measurement process, the molten resin R positioned behind the check ring 65 passes through the clearance to be ejected forward of the check ring 65.

Figure 13:
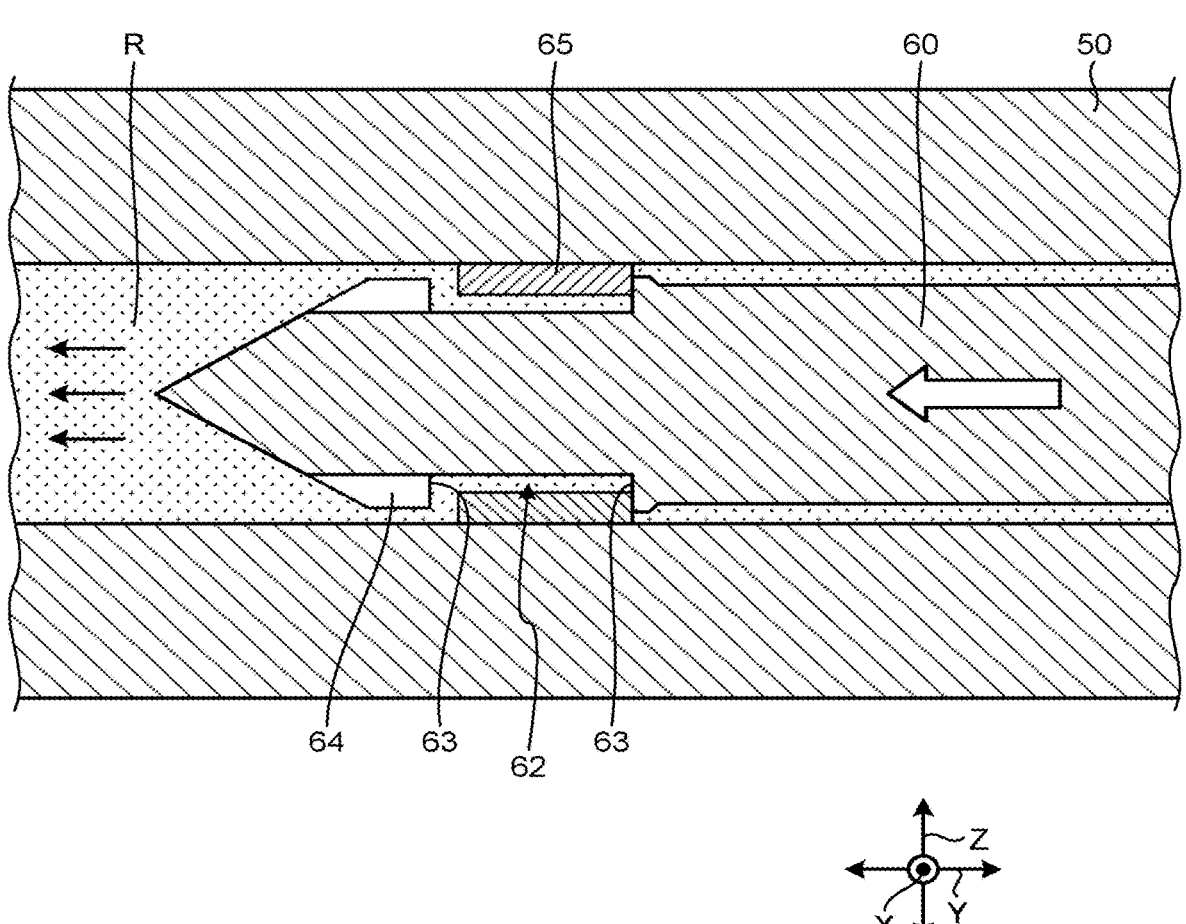
FIG. 13 is an explanatory diagram illustrating a state of a check ring at the time of injecting the molten resin.

On the other hand, in injecting the molten resin R measured in the measurement process, the molten resin R is disabled from moving between both sides in the longitudinal direction Y of the check ring 65. FIG. 13 is an explanatory diagram illustrating a state of the check ring 65 at the time of injecting the molten resin R. In the injection process, at the time when the molten resin R in the heating barrel 50 is injected from the nozzle part 52, the screw 60 is moved forward by causing the forward/backward movement mechanism 80 to operate by the control unit 100. Due to this, forward pressing force in the longitudinal direction Y is applied from the screw 60 to the molten resin R positioned in front of the check ring 65 in the heating barrel 50. The width in the longitudinal direction Y of the check ring 65 disposed in the groove part 62 of the screw 60 is smaller than a groove width of the groove part 62 of the screw 60, so that the check ring 65 can move in a groove width direction in the groove part 62.

When forward pressing force is applied to the molten resin R positioned in front of the check ring 65 as the screw 60 is moved forward, the pressing force in a rear direction works on the check ring 65 from the molten resin R as reaction force. Due to this, the check ring 65 moves backward relatively to the groove part 62 in a range in which the groove part 62 is formed on the screw 60, and abuts on the groove wall 63 positioned behind the groove part 62 in the groove width direction.

Due to this, there is no gap between the check ring 65 and the groove wall 63 positioned behind the groove part 62 in the groove width direction, so that the molten resin R cannot pass. That is, even in a case in which the molten resin R positioned in front of the check ring 65 passes through the communicating part 64 formed on the screw 60 to flow into the clearance between the inner peripheral surface of the check ring 65 and the groove bottom of the groove part 62, the molten resin R cannot flow rearward of the present position. Thus, at the time of injecting the molten resin R measured in the measurement process by moving the screw 60 forward in the injection process, the molten resin R positioned in front of the check ring 65 does not flow rearward of the check ring 65 and is ejected from the nozzle part 52.

At this point, the molten resin R contains the dispersed air bubbles B, so that the molten resin R containing the air bubbles B that are uniformly dispersed is injected into the cavity 17 formed in the mold 16 from the nozzle part 52 via the through hole 18 of the fixed mold 16f in the injection process. Due to this, the cavity 17 is filled with the molten resin R containing the air bubbles B that are uniformly dispersed.

Herein, in the measurement process, measurement is performed while increasing the back pressure of the molten resin R, so that the air contained in the air bubbles B in the molten resin R is in the supercritical state. On the other hand, the pressure of the molten resin R in the cavity 17 at the time when the molten resin R is injected into the cavity 17 is lower than the back pressure of the molten resin R positioned in front of the check ring 65 in the measurement process. Due to this, the air bubbles B contained in the molten resin R grow in the cavity 17. Thus, foam molding is performed in the cavity 17 into which the molten resin R is injected, and the molten resin R containing the air bubbles B that are uniformly dispersed is molded as a foam molded article M.

Effects of First Embodiment

In the foam molding method, the control method for the injection molding machine 1 for foam molding, and the injection molding machine 1 for foam molding according to the first embodiment described above, the air A taken into the heating barrel 50 is dispersed in the molten resin R as the air bubbles B, and the molten resin R containing the dispersed air bubbles B is injected into the cavity 17. Due to this, an existing injection molding machine can be used as the injection molding machine 1 for foam molding without using an injection molding machine dedicated to foam molding, and foam molding can be performed without using a device such as a high-pressure gas generation device. As a result, cost for performing foam molding can be reduced.

Additionally, the air contained in the air bubbles B is brought into the state of supercritical fluid by applying pressure to the air bubbles B dispersed in the molten resin R in the measurement process, so that the air contained in the air bubbles B can be made a supercritical fluid by applying a large pressure to the air bubbles B in the measurement process for the molten resin R without using high-pressure gas as gas used for foam molding or using a device for increasing a pressure of the gas. As a result, foam molding can be performed more securely while suppressing increase in the cost.

Second Embodiment

The injection molding machine 1 for foam molding according to a second embodiment has substantially the same configuration as that of the injection molding machine 1 for foam molding according to the first embodiment, but is characterized in that the heating barrel 50 includes a supply port 56. Other configurations are the same as those of the first embodiment, so that the description thereof will not be repeated, and the same configuration is denoted by the same reference numeral.

Figure 14:
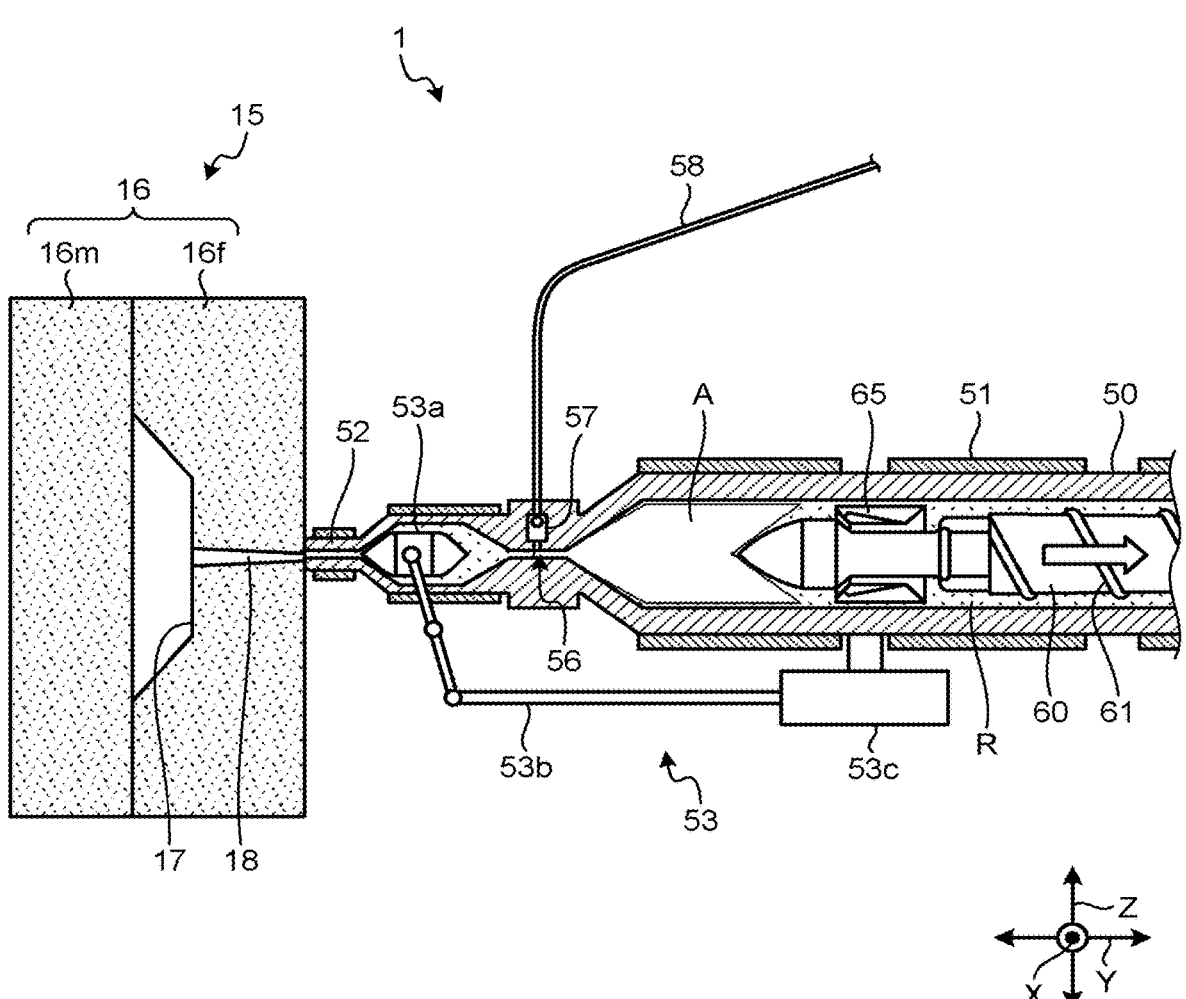
FIG. 14 is a schematic diagram of a principal part of a heating barrel included in an injection molding machine for foam molding according to a second embodiment.

FIG. 14 is a schematic diagram of a principal part of the heating barrel 50 included in the injection molding machine 1 for foam molding according to the second embodiment. In the injection molding machine 1 for foam molding according to the present second embodiment, the shut-off nozzle 53 is disposed on the heating barrel 50 similarly to the first embodiment. Additionally, in the second embodiment, the supply port 56 through which the air A can be supplied into the heating barrel 50 is disposed in front of the screw 60 in the longitudinal direction Y of the heating barrel 50. The supply port 56 is disposed between the position at which the screw 60 is disposed in the longitudinal direction Y of the heating barrel 50 and the open/close part 53*a* of the shut-off nozzle 53 of the heating barrel 50.

A check valve 57 is disposed at the supply port 56 to switch between a state in which the inside of the heating barrel 50 is made to communicate with the outside via the supply port 56 and a state in which communication between the inside and the outside of the heating barrel 50 is blocked. The check valve 57 is disposed in the heating barrel 50 in orientation for causing the inside of the heating barrel 50 to communicate with the outside, and the supply port 56 is positioned at an end close to an inner side of the heating barrel 50 in a communication direction of the check valve 57, and opens in the heating barrel 50. On the other hand, a supply pipe 58 through which the air outside the heating barrel 50 is made to flow toward the check valve 57 is connected to an end close to the outer side of the heating barrel 50 in the communication direction of the check valve 57. An end of the supply pipe 58 opposite to a side connected to the check valve 57 is opened to the air, and the supply pipe 58 can supply the air to the check valve 57.

The check valve 57 can be opened or closed based on a difference between a pressure of the atmosphere inside the heating barrel 50 and atmospheric pressure. The check valve 57 is opened in a case in which the pressure of the atmosphere inside the heating barrel 50 is lower than the atmospheric pressure with a predetermined pressure difference or more, and the check valve 57 is closed in other cases. That is, the check valve 57 is configured to be opened in a case in which the pressure of the atmosphere inside the heating barrel 50 to which the supply port 56 opens is lower than the atmospheric pressure outside the heating barrel 50 supplied through the supply pipe 58 with the predetermined pressure difference or more, and the check valve 57 is configured to be closed in other cases. Accordingly, the supply port 56 can be switched between a state in which the air A can be supplied into the heating barrel 50 and a state in which the air A cannot be supplied into the heating barrel 50 in accordance with a difference between the pressure of the atmosphere inside the heating barrel 50 and the atmospheric pressure.

<Method of Foam Molding>

Figure 15:
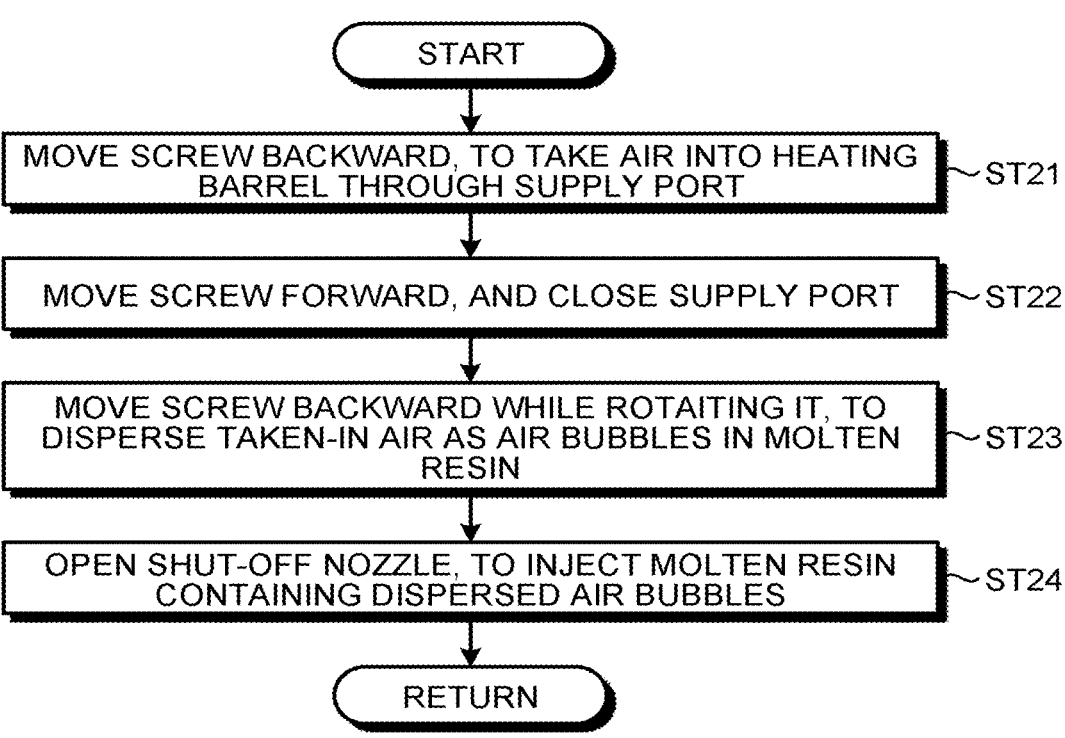
FIG. 15 is a flowchart illustrating a procedure in performing foam molding using the injection molding machine for foam molding according to the second embodiment.

FIG. 15 is a flowchart illustrating a procedure in performing foam molding using the injection molding machine 1 for foam molding according to the second embodiment. In performing foam molding using the injection molding machine 1 for foam molding according to the second embodiment, first, the screw 60 is moved backward in a state in which the shut-off nozzle 53 is closed, and the supply port

56 is opened to take the air A into the heating barrel 50 through the supply port 56 (Step ST21). That is, in a case of causing the forward/backward movement mechanism 80 to operate to move the screw 60 backward in a state in which the shut-off nozzle 53 is closed, the pressure of the atmosphere is lowered in a portion between the screw 60 and the shut-off nozzle 53 in the heating barrel 50. Due to this, the check valve 57 is brought into an open state due to a difference between the pressure of the atmosphere inside the heating barrel 50 and the atmospheric pressure, the check valve 57 communicating with the supply port 56 that opens to the inside of the heating barrel 50 in the portion between the screw 60 and the shut-off nozzle 53 in the longitudinal direction Y, that is, the supply port 56 is brought into the open state.

In this way, when the screw 60 is further moved backward in a state in which the supply port 56 is opened, the air A around the heating barrel 50 enters the heating barrel 50 due to a difference between the pressure of the portion between the screw 60 and the shut-off nozzle 53 in the heating barrel 50 and the atmospheric pressure communicating with the heating barrel 50 via the check valve 57 and the supply pipe 58. In other words, when the screw 60 is moved backward in a state in which the shut-off nozzle 53 is closed, the pressure in the portion between the screw 60 and the shut-off nozzle 53 in the heating barrel 50 becomes a negative pressure, so that the check valve 57 is opened, and the air A around the heating barrel 50 flows into the heating barrel 50 from the supply port 56 through the supply pipe 58. In this case, the screw 60 is moved backward at a relatively high speed in a state in which rotation of the screw 60 is stopped so that the check valve 57 can be opened by increasing the negative pressure of the portion between the screw 60 and the shut-off nozzle 53 in the heating barrel 50. Due to this, the air A is taken into the heating barrel 50 from the supply port 56.

Next, the screw 60 is moved forward to close the supply port 56 (Step ST22). That is, by causing the forward/backward movement mechanism 80 to operate and moving the screw 60 forward, the pressure of the portion between the screw 60 and the shut-off nozzle 53 in the heating barrel 50 is increased, and the check valve 57 is closed. Due to this, the supply port 56 opening to the inside of the heating barrel 50 is closed. In this state, by moving the screw 60 further forward, the air A taken into the heating barrel 50 is diffused in the molten resin R in the heating barrel 50.

Specifically, in a case where the screw 60 is moved forward in a state in which the shut-off nozzle 53 and the supply port 56 are closed, the air A taken into the portion between the screw 60 and the shut-off nozzle 53, that is, the air A taken into the portion in front of the check ring 65, is compressed by the screw 60 that is moving forward. Due to this, the air A taken into the portion in front of the check ring 65 passes through a portion at which the check ring 65 is disposed, and flows to the portion behind the check ring 65. Due to this, the air A taken into the heating barrel 50 through the supply port 56 is diffused in the molten resin R that is positioned in a portion behind the check ring 65.

Next, the screw 60 is moved backward while being rotated, and the taken-in air A is dispersed as air bubbles B in the molten resin R (Step ST23). That is, by causing the forward/backward movement mechanism 80 to operate to move the screw 60 backward while causing the rotation mechanism 70 to operate to rotate the screw 60 in a state in which the supply port 56 is closed, the molten resin R is fed forward while dispersing the air A taken into the heating barrel 50 in the molten resin R as the air bubbles B, and the molten resin R is measured. In other words, in the measurement process for the molten resin R, the air A taken into the heating barrel 50 is dispersed in the molten resin R as the air bubbles B by the operation of the screw 60 in the measurement process for feeding the molten resin R forward while kneading it.

In this case, a backward movement speed of the screw 60 is made lower than the backward movement speed of the screw 60 in a case of taking the air A into the heating barrel 50 through the supply port 56 at Step ST21, and the molten resin R is fed forward by rotating the screw 60, so that the pressure of the portion between the screw 60 and the shut-off nozzle 53 in the heating barrel 50 does not become a negative pressure, and the check valve 57 is not opened. Due to this, the back pressure of the molten resin R fed to the front side of the check ring 65 disposed on the screw 60 in the heating barrel 50 can be increased, and the pressure working on the air bubbles B contained in the molten resin R can also be increased. Accordingly, the air contained in the air bubbles B in the molten resin R can be brought into the supercritical state.

Next, the shut-off nozzle 53 is opened, and the molten resin R containing the dispersed air bubbles B is injected into the cavity 17 (Step ST24). That is, by opening the shut-off nozzle 53 and causing the forward/backward movement mechanism 80 to operate to move the screw 60 forward, the molten resin R measured in the heating barrel 50 in the measurement process is injected into the cavity 17 formed in the mold 16 in the injection process.

In this case, the pressure of the portion between the screw 60 and the shut-off nozzle 53 in the heating barrel 50 is increased due to forward movement of the screw 60, so that the check valve 57 is not opened. Due to this, the molten resin R positioned in front of the check ring 65 in the heating barrel 50 is ejected from the nozzle part 52, the pressure of the molten resin R being increased due to forward movement of the screw 60. Due to this, the molten resin R containing the air bubbles B that are uniformly dispersed is injected into the cavity 17 formed in the mold 16 via the through hole 18 of the fixed mold 16f from the nozzle part 52, and the cavity 17 is filled with the molten resin R containing the air bubbles B that are uniformly dispersed.

At this point, the air contained in the air bubbles B in the molten resin R is in the supercritical state in the heating barrel 50, but the pressure of the molten resin R in the cavity 17 is lower than the back pressure of the molten resin R positioned in front of the check ring 65 in the measurement process. Due to this, the air bubbles B contained in the molten resin R grow in the cavity 17. Thus, foam molding is performed in the cavity 17 into which the molten resin R is injected, and the molten resin R containing the air bubbles B that are uniformly dispersed is molded as the foam molded article M.

Effects of Second Embodiment

The foam molding method, the control method for the injection molding machine 1 for foam molding, and the injection molding machine 1 for foam molding according to the second embodiment described above include the supply port 56 that can switch between the state in which the air A can be supplied into the heating barrel 50 and the state in which the air A cannot be supplied into the heating barrel 50, so that the air A can be taken into the heating barrel 50 through the supply port 56. Due to this, the air A can be taken into the heating barrel 50 without performing an operation of moving the injection device 10 in the longitudinal direction Y by the propulsion mechanism 40, and causing the nozzle part 52 of the heating barrel 50 to be separated from or brought closer to the mold 16. Accordingly, a frequency of the operation of the propulsion mechanism 40 can be reduced, and durability of the propulsion mechanism 40 can be secured, so that a frequency of replacing parts can be reduced. As a result, cost for performing foam molding can be reduced.

Third Embodiment

The injection molding machine 1 for foam molding according to a third embodiment has substantially the same configuration as that of the injection molding machine 1 for foam molding according to the second embodiment, but is characterized in that compressed gas is supplied into the heating barrel 50. Other configurations are the same as those of the second embodiment, so that the description thereof will not be repeated, and the same configuration is denoted by the same reference numeral.

Figure 16:
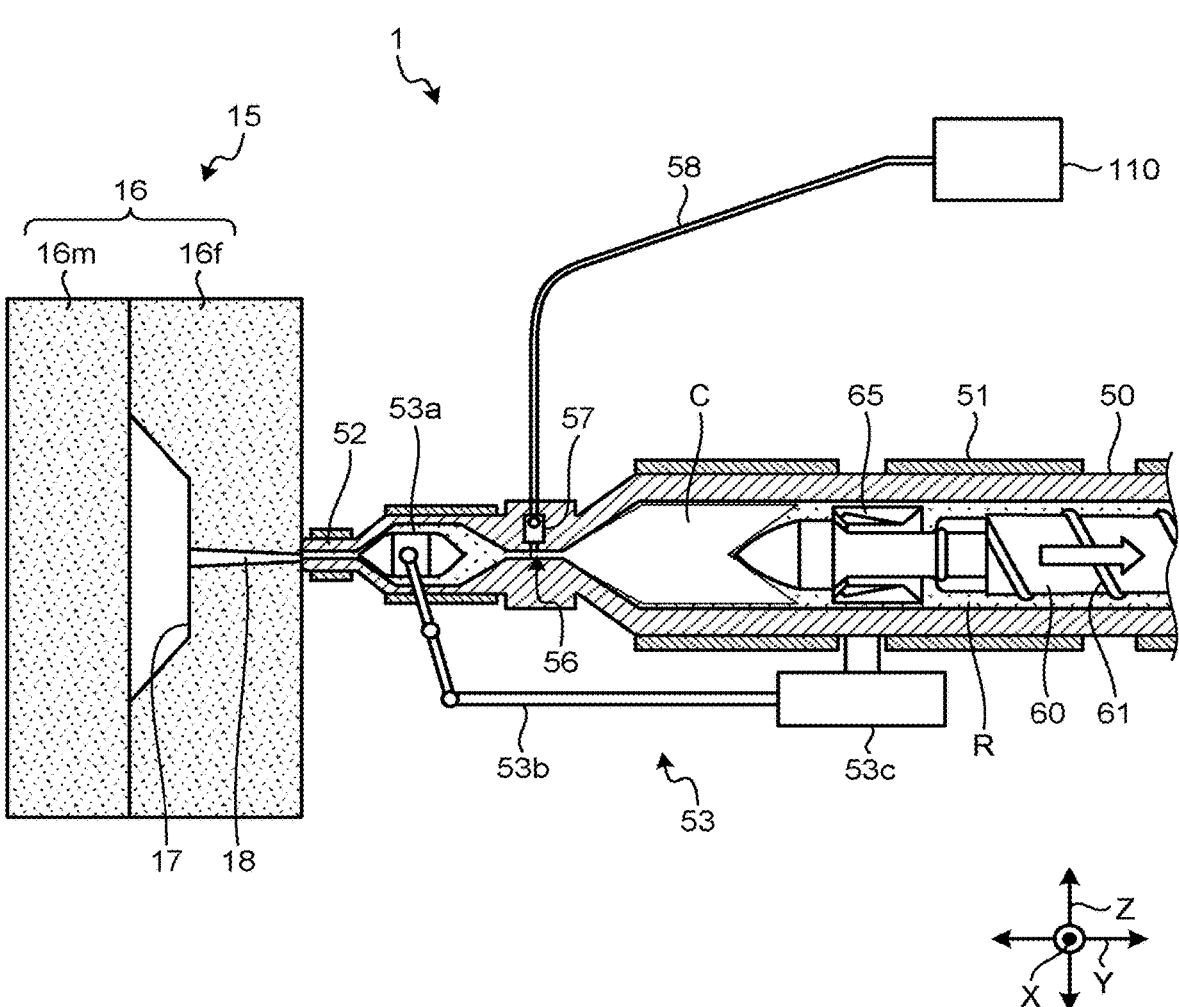
FIG. 16 is a schematic diagram of a principal part of a heating barrel included in an injection molding machine for foam molding according to a third embodiment.

FIG. 16 is a schematic diagram of a principal part of the heating barrel 50 included in the injection molding machine 1 for foam molding according to the third embodiment. In the injection molding machine 1 for foam molding according to the present third embodiment, similarly to the second embodiment, the supply port 56 is disposed between the position at which the screw 60 is disposed in the longitudinal direction Y of the heating barrel 50 and the open/close part 53a of the shut-off nozzle 53 of the heating barrel 50. In this way, the check valve 57 is disposed on the supply port 56 disposed on the heating barrel 50, and the supply pipe 58 is connected to the end close to the outer side of the heating barrel 50 in the communication direction of the check valve 57.

In the present third embodiment, a compressor 110 is connected to the end of the supply pipe 58 opposite to the side connected to the check valve 57. The compressor 110 can suck the air, and compress the sucked air to be supplied to the supply pipe 58 as compressed gas C. Due to this, the supply pipe 58 can supply the compressed gas C supplied from the compressor 110 to the check valve 57. The compressed gas C supplied from the compressor 110 has a pressure lower than 1 MPa.

The check valve 57 is configured to be opened in a case in which the pressure of the atmosphere inside the heating barrel 50 to which the supply port 56 opens is lower than the pressure of the compressed gas C supplied through the supply pipe 58 with a predetermined pressure difference or more, and the check valve 57 is configured to be closed in other cases. Accordingly, the supply port 56 can switch between a state in which the compressed gas C can be supplied into the heating barrel 50 and a state in which the compressed gas C cannot be supplied into the heating barrel 50 in accordance with a difference between the pressure of the atmosphere inside the heating barrel 50 and the pressure of the compressed gas C.

<Method of Foam Molding>

Figure 17:
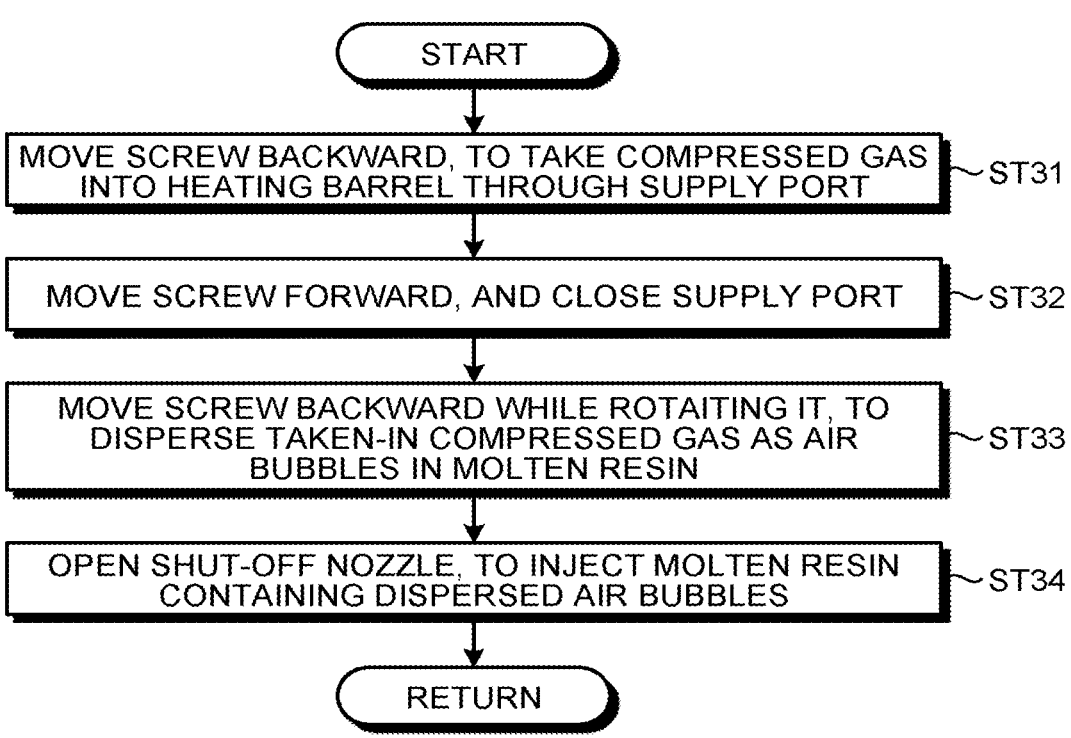
FIG. 17 is a flowchart illustrating a procedure in performing foam molding using the injection molding machine for foam molding according to the third embodiment.

FIG. 17 is a flowchart illustrating a procedure in performing foam molding using the injection molding machine 1 for foam molding according to the third embodiment. In performing foam molding using the injection molding machine 1 for foam molding according to the third embodiment, the screw 60 is moved backward in a state in which the shut-off nozzle 53 is closed, and the supply port 56 is opened to take the compressed gas C into the heating barrel 50 through the supply port 56 (Step ST31). That is, when the forward/backward movement mechanism 80 is made to operate to move the screw 60 backward in a state in which the shut-off nozzle 53 is closed, the check valve 57 is brought into an open state due to a difference between the pressure of the atmosphere inside the heating barrel 50 and the pressure of the compressed gas C supplied from the compressor 110, that is, the supply port 56 is brought into an open state.

Due to this, the compressed gas C supplied to the heating barrel 50 from the compressor 110 via the supply pipe 58 enters the heating barrel 50 through the supply port 56. That is, by moving the screw 60 backward in a state in which the shut-off nozzle 53 is closed and rotation of the screw 60 is stopped, the compressed gas C is taken into the heating barrel 50 through the supply port 56.

Next, the screw 60 is moved forward to close the supply port 56 (Step ST32). That is, by causing the forward/backward movement mechanism 80 to operate and moving the screw 60 forward, the pressure of the portion between the screw 60 and the shut-off nozzle 53 in the heating barrel 50 is increased, and the check valve 57 is closed. Due to this, the supply port 56 opening to the inside of the heating barrel 50 is closed. In this state, by moving the screw 60 further forward, the compressed gas C taken into the portion in front of the check ring 65 is compressed, and the compressed gas C is made to pass through the portion at which the check ring 65 is disposed to flow to the portion behind the check ring 65. Due to this, the compressed gas C taken into the heating barrel 50 is diffused in the molten resin R in the heating barrel 50.

Next, the screw 60 is moved backward while being rotated, and the taken-in compressed gas C is dispersed as the air bubbles B in the molten resin R (Step ST33). That is, by causing the forward/backward movement mechanism 80 to operate to move the screw 60 backward while causing the rotation mechanism 70 to operate to rotate the screw 60 in a state in which the supply port 56 is closed, the molten resin R is fed forward while dispersing the compressed gas C taken into the heating barrel 50 in the molten resin R as the air bubbles B, and the molten resin R is measured. In the measurement process for measuring the molten resin R, measurement is performed while increasing the back pressure of the molten resin R that has been fed to the front side of the check ring 65 disposed on the screw 60, so that the pressure working on the air bubbles B contained in the molten resin R can also be increased. Accordingly, the compressed gas C contained in the air bubbles B in the molten resin R, that is, the air, can be brought into the supercritical state.

Next, the shut-off nozzle 53 is opened, and the molten resin R containing the dispersed air bubbles B is injected into the cavity 17 (Step ST34). That is, by opening the shut-off nozzle 53 and causing the forward/backward movement mechanism 80 to operate to move the screw 60 forward, the molten resin R measured in the heating barrel 50 in the measurement process is injected into the cavity 17 formed in the mold 16 in the injection process. Due to this, the cavity 17 is filled with the molten resin R containing the air bubbles B that are uniformly dispersed. At this point, the compressed gas C contained in the air bubbles B in the molten resin R is in the supercritical state in the heating barrel 50, but the pressure of the molten resin R in the cavity 17 is lower than the back pressure of the molten resin R positioned in front of the check ring 65 in the measurement process. Due to this, foam molding is performed as the air bubbles B grow in the cavity 17 into which the molten resin R is injected, and the molten resin R containing the air bubbles B that are uniformly dispersed is molded as the foam molded article M.

Effects of Third Embodiment

In the foam molding method, the control method for the injection molding machine 1 for foam molding, and the injection molding machine 1 for foam molding according to the third embodiment described above, the compressed gas C the pressure of which is increased is taken into the heating barrel 50 through the supply port 56, so that it is possible to increase an amount of gas taken into the heating barrel 50 to perform foam molding. Due to this, when the compressed gas C taken into the heating barrel 50 is dispersed as the air bubbles B in the molten resin R, a larger number of the air bubbles B can be dispersed in the molten resin R. Thus, foam molding can be more easily performed while reducing the frequency of the operation of the propulsion mechanism 40 and securing the durability of the propulsion mechanism 40. As a result, the cost for performing foam molding can be reduced while performing foam molding more easily.

The pressure of the compressed gas C is lower than 1 MPa, so that a large number of the air bubbles B can be dispersed in the molten resin R by using the compressed gas C without largely increasing strength of a portion through which the compressed gas C flows in the injection molding machine 1 for foam molding. As a result, the cost for performing foam molding can be reduced more securely while performing foam molding more easily.

By causing the pressure of the compressed gas C to be lower than 1 MPa, the compressed gas C can be used without performing a procedure such as an application for using a facility required for using high-pressure gas. Due to this, the cost for using the compressed gas C can be suppressed more securely, and the cost for performing foam molding can be reduced more securely.

Modification

Figure 18:
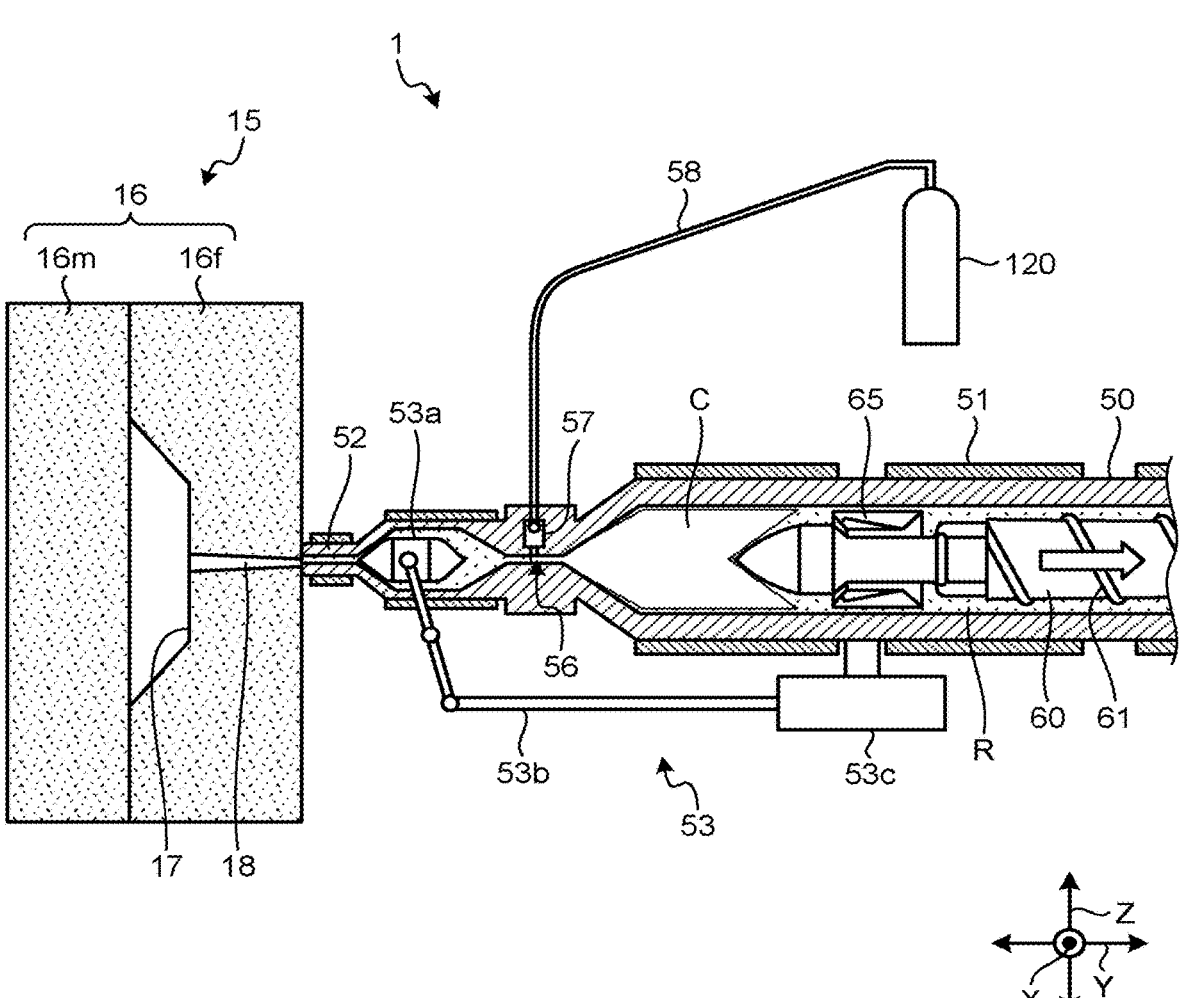
FIG. 18 is an explanatory diagram of a modification of the injection molding machine for foam molding according to the second embodiment in a case of using a bomb to supply compressed gas.

In the second embodiment described above, the compressor 110 is used as a supply source of the compressed gas C supplied into the heating barrel 50, but a component other than the compressor 110 may be used as the supply source of the compressed gas C. FIG. 18 is an explanatory diagram of a modification of the injection molding machine 1 for foam molding according to the second embodiment in a case of using a bomb 120 to supply the compressed gas C. As the supply source of the compressed gas C supplied into the heating barrel 50, for example, the bomb 120 in which the compressed gas C is stored may be used as illustrated in FIG. 18. In this case, it is preferable to use an inert gas such as a nitrogen gas as the compressed gas C, and use the bomb 120 in which an inert gas such as a nitrogen gas is stored.

In this way, when the bomb 120 in which the compressed gas C is stored is used as the supply source of the compressed gas C supplied into the heating barrel 50, an energy source such as a power source for causing the compressor 110 to operate is not required as in a case of using the compressor 110 as the supply source of the compressed gas C. Due to this, irrespective of a facility at an installation place of the injection molding machine 1 for foam molding, the compressed gas C can be easily supplied into the heating barrel 50. As a result, foam molding can be more easily performed while reducing the cost for performing foam molding.

<Experiment on Foam Molding Method>

Figure 19:
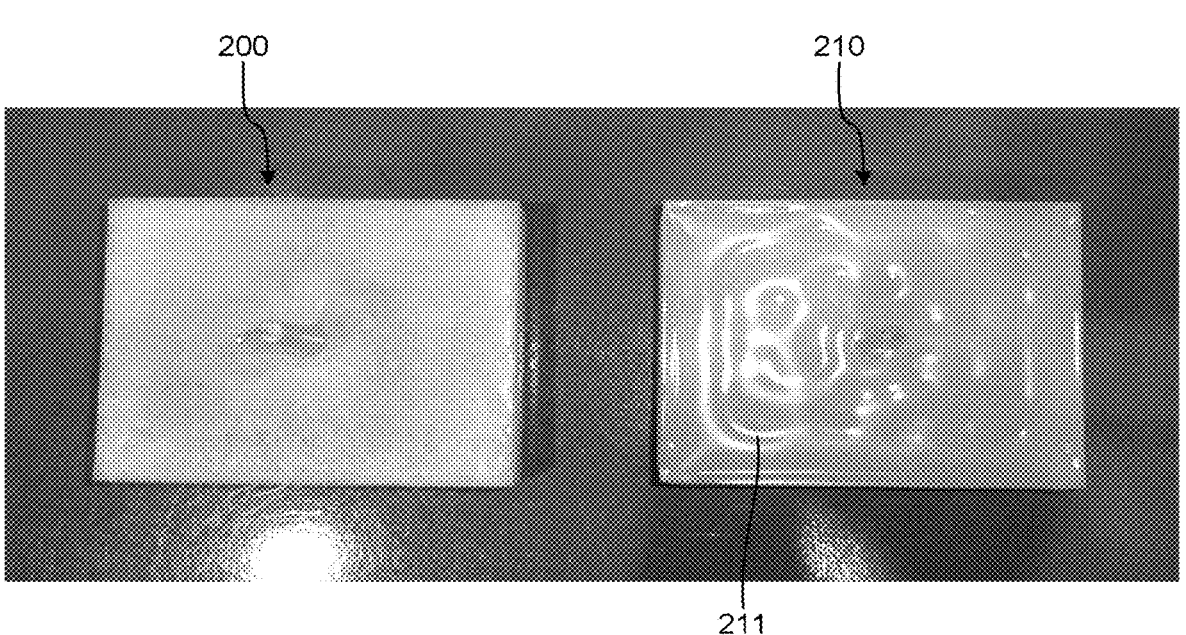
FIG. 19 is an external view of foam molding samples obtained by an experiment on foam molding.

The present inventors have performed an experiment on foam molding using the foam molding method according to the first embodiment. Next, the following describes the experiment on foam molding. The experiment on foam molding was performed by molding samples by foam molding using the foam molding method according to the first embodiment, and by standard molding without performing foam molding, respectively. FIG. 19 is an external view of a foam molding samples obtained by the experiment on foam molding. FIG. 19 is a photograph of the foam molding samples obtained by the experiment on foam molding. Of the two samples illustrated in FIG. 19, a left side is a foam molding sample 200 as a sample obtained by foam molding using the foam molding method according to the first embodiment, and a right side is a standard molding sample 210 as a sample obtained by standard molding without performing foam molding.

The foam molding sample 200 and the standard molding sample 210 each had a plate shape having a length of 100 mm, a width of 75 mm, and a thickness of 4 mm, and molding was performed by using a thick mold having a relatively large thickness dimension as a mold used for molding. A gate through which the molten resin is charged (the through hole 18 of the fixed mold 16*f* in the injection molding machine 1 for foam molding according to the first embodiment) is disposed at the center of the sample. Regarding molding machines used for molding, in both of the injection molding machine 1 for foam molding with which the foam molding sample 200 is molded and the injection molding machine with which the standard molding sample 210 is molded, a screw diameter is 36 mm and a mold clamping force of a mold clamping device is 980 kN, and they have specifications of a standard injection molding machine except that a shut-off nozzle is attached thereto.

Polypropylene is used as resin as a material of a molded article, a screw stroke setting at the time of measurement in the measurement process is 36 mm, a back pressure setting is 10 MPa, and a filling speed is 25 mm/s. To check an effect of foaming in foam molding, pressure keeping setting after filling the mold with the molten resin was 0 MPa, that is, pressure keeping was not used. In foam molding using the foam molding method according to the first embodiment, the screw was moved backward by 144 mm in a state in which the shut-off nozzle was opened, and the screw was moved in the longitudinal direction Y and rotated after the air is sucked into the heating barrel via the nozzle part to diffuse the air taken into the heating barrel in the molten resin.

The foam molding sample 200 and the standard molding sample 210 both have a thickness of 4 mm and are relatively thick. Thus, as illustrated in FIG. 19, a shrink mark 211 as a molding fault is generated on the entire surface of the standard molding sample 210, but no shrink mark is generated on the foam molding sample 200. Due to this, it was found that, in a case of performing foam molding using the foam molding method according to the embodiment, an effect of suppressing the shrink mark was confirmed in thick molding and effective foam molding could be performed.

The invention claimed is:

1. A foam molding method for molding a foam molded article by injecting molten resin containing air bubbles that are uniformly dispersed, into a cavity formed by a mold, the foam molding method comprising:

moving a screw backward to take air into a barrel through a nozzle part in a state in which a shut-off nozzle is opened, the shut-off nozzle disposed on the barrel for kneading the molten resin in which the screw is disposed, and opening and closing the nozzle part for injecting the molten resin;

closing the shut-off nozzle and moving the screw forward to diffuse the air taken into the barrel, in the molten resin in the barrel;

feeding the molten resin forward while dispersing the air as the air bubbles in the molten resin by moving the screw backward while rotating the screw in a state in which the shut-off nozzle is closed; and opening the shut-off nozzle, to inject the molten resin containing the dispersed air bubbles into the cavity.

2. A foam molding method for molding a foam molded article by injecting molten resin containing air bubbles that are uniformly dispersed, into a cavity formed by a mold, the foam molding method comprising:

moving a screw backward, the screw disposed inside a barrel in which the molten resin is kneaded, and opening a supply port that is disposed in front of the screw in the barrel and capable of switching between a state in which air is able to be supplied into the barrel and a state in which the air is unable to be supplied into the barrel, to take the air into the barrel through the supply port;

moving the screw forward and closing the supply port, to diffuse the air taken into the barrel in the molten resin in the barrel;

feeding the molten resin forward while dispersing the air as the air bubbles in the molten resin by moving the screw backward while rotating the screw in a state in which the supply port is closed; and injecting the molten resin containing the dispersed air bubbles into the cavity.

3. A foam molding method for molding a foam molded article by injecting molten resin containing air bubbles that are uniformly dispersed, into a cavity formed by a mold, the foam molding method comprising:

moving a screw backward, the screw disposed inside a barrel in which the molten resin is kneaded, and opening a supply port that is disposed in front of the screw in the barrel and capable of switching between a state where compressed gas is able to be supplied into the barrel and a state where the compressed gas is unable to be supplied into the barrel, to take the compressed gas into the barrel through the supply port;

moving the screw forward and closing the supply port, to diffuse the compressed gas taken into the barrel, in the molten resin in the barrel;

feeding the molten resin forward while dispersing the compressed gas as the air bubbles in the molten resin by moving the screw backward while rotating the screw in a state in which the supply port is closed; and injecting the molten resin containing the dispersed air bubbles into the cavity.

4. The foam molding method according to claim 3, wherein a pressure of the compressed gas is lower than 1 MPa.

5. A control method for an injection molding machine for foam molding for molding a foam molded article by injecting molten resin containing air bubbles that are uniformly dispersed, into a cavity formed by a mold, the control method comprising:

moving a screw backward to take air into a barrel through a nozzle part in a state in which a shut-off nozzle is opened, the shut-off nozzle disposed on the barrel for kneading the molten resin in which the screw is disposed, and opening and closing the nozzle part for injecting the molten resin;

closing the shut-off nozzle and moving the screw forward, to diffuse the air taken into the barrel, in the molten resin in the barrel;

feeding the molten resin forward while dispersing the air as the air bubbles in the molten resin by moving the screw backward while rotating the screw in a state in which the shut-off nozzle is closed; and opening the shut-off nozzle, to inject the molten resin containing the dispersed air bubbles into the cavity.

\*  \*  \*  \*  \*